(12) United States Patent
Park

(10) Patent No.: US 9,819,482 B2
(45) Date of Patent: Nov. 14, 2017

(54) RECONFIGURABLE KEY SEARCH ENGINE

(71) Applicant: SAMSUNG ELECTRONICS CO., LTD., Suwon-si, Gyeonggi-Do (KR)

(72) Inventor: Tae Gon Park, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 85 days.

(21) Appl. No.: 13/930,408

(22) Filed: Jun. 28, 2013

(65) Prior Publication Data

US 2014/0010370 A1  Jan. 9, 2014

Related U.S. Application Data

(62) Division of application No. 11/081,000, filed on Mar. 16, 2005, now abandoned.

(30) Foreign Application Priority Data

Aug. 12, 2004  (KR) .................. 10-2004-0063397

(51) Int. Cl.
  *H04L 9/08*   (2006.01)
  *H04L 29/06*  (2006.01)
  *H04W 12/04*  (2009.01)

(52) U.S. Cl.
  CPC ............ *H04L 9/0816* (2013.01); *H04L 9/083* (2013.01); *H04L 9/0897* (2013.01); *H04L 63/06* (2013.01); *H04W 12/04* (2013.01); *H04L 2209/80* (2013.01)

(58) Field of Classification Search
  CPC ... H04L 9/0816; H04L 9/0838; H04L 9/0894; H04L 2209/24; H04L 63/06; H04L 63/061; H04L 63/062; H04L 63/064; H04L 63/065; H04L 63/067; H04L 63/068; H04W 12/04
  See application file for complete search history.

(56) References Cited

U.S. PATENT DOCUMENTS

| | | | |
|---|---|---|---|
| 5,222,137 A | 6/1993 | Barrett et al. | |
| 5,481,610 A | 1/1996 | Doiron et al. | |
| 5,974,409 A | 10/1999 | Sanu et al. | |
| 6,026,165 A | 2/2000 | Marino et al. | |
| 6,347,376 B1 * | 2/2002 | Attwood et al. | 726/1 |
| 7,783,037 B1 * | 8/2010 | Bong | 380/37 |
| 2001/0042204 A1 * | 11/2001 | Blaker et al. | 713/165 |
| 2002/0101995 A1 | 8/2002 | Hashimoto et al. | |
| 2002/0116526 A1 | 8/2002 | Brown | |
| 2003/0007489 A1 | 1/2003 | Krishnan et al. | |

(Continued)

FOREIGN PATENT DOCUMENTS

| | | |
|---|---|---|
| CN | 1378735 A | 11/2002 |
| JP | 2001053801 A | 2/2001 |
| WO | 2004034645 A1 | 4/2004 |

OTHER PUBLICATIONS

Japanese Patent Office, Office Action dated Jan. 4, 2011.
Chinese Patent Office, Office Action dated Apr. 3, 2009.

*Primary Examiner* — Darren B Schwartz
(74) *Attorney, Agent, or Firm* — Volentine & Whitt, PLLC

(57) ABSTRACT

A Reconfigurable Key Search Engine (RKSE) in a mobile unit is adapted to efficiently search a memory system storing a plurality of security keys potentially related to multiple networks. The memory system may be a hierarchical memory system including at least one associative memory.

9 Claims, 20 Drawing Sheets

(56) References Cited

U.S. PATENT DOCUMENTS

| | | |
|---|---|---|
| 2003/0012198 A1 | 1/2003 | Kaganoi et al. |
| 2003/0016827 A1 | 1/2003 | Asano et al. |
| 2003/0061495 A1* | 3/2003 | Minnick .................. 713/189 |
| 2003/0061507 A1* | 3/2003 | Xiong et al. ............. 713/201 |
| 2004/0068653 A1 | 4/2004 | Fascenda |
| 2004/0210582 A1* | 10/2004 | Chatterjee et al. ............ 707/9 |
| 2005/0198531 A1* | 9/2005 | Kaniz et al. ............. 713/201 |
| 2005/0283711 A1* | 12/2005 | Claseman .................. 714/759 |
| 2006/0020444 A1* | 1/2006 | Cousineau et al. ............ 704/1 |

\* cited by examiner

RECONFIGURABLE KEY SEARCH ENGINE

CROSS-REFERENCE TO RELATED APPLICATIONS

This application is a Divisional of U.S. application Ser. No. 11/081,000, filed Mar. 16, 2005, which claims priority under 35 U.S.C. 119 from Korean Patent Application No. 10-2004-0063397, filed Aug. 12, 2004, the subject matter of which is hereby incorporated by reference.

BACKGROUND OF THE INVENTION

1. Field of the Invention

The invention relates generally to a key search engine. More particularly, the invention relates to a reconfigurable key search engine adapted for use in a mobile unit capable of operating within a plurality of networks.

2. Description of the Related Art

New network standards and particularly wireless network standards are constantly being introduced. The term "wireless" generally refers to any system communicating data via a radio frequency (RF) or infrared (IR) link. The manner in which data is wirelessly exchanged between elements or components in a network is defined by one or more technical standards. Looking at wireless network standards, one finds a dizzying array of technical specifications including, as examples, Wi-Fi, Bluetooth, PCS, DECT, PWT, pager, cellular, and IEEE 802.11, 802.11a, 802.11b, 802.11i, 802.11g, 802.1x, WEP, WPA, and WPA2. These standards and others are introduced by various standards setting bodies, such the Institute of Electrical and Electronics Engineers (IEEE), the Wi-Fi Alliance, and the Internet Engineering Task Force (IETF).

Working with IEEE-defined technical requirements, the Wi-Fi Alliance seeks to practically implement wireless network standards through an interoperability testing and certification program. The IETF seeks to define the evolution of Internet architecture and standardize its operation. The wireless standards or protocols produced by these groups address, among other issues, the issues of data privacy (encryption/decryption) and user authentication.

The term "protocol" broadly describes any agreed upon standard enabling data communication between two or more network elements or components. In the classic sense, a protocol establishes standards that "holds together" the data communication network. At a minimum, a protocol will define acceptable data expressions and related data packet configurations. Data privacy encoding, error checking/correcting encoding, data (or data packet) identification information, and similar data management features are normally part and parcel of a protocol.

The development of wired and wireless data communication protocols is an evolutionary process driven largely by advances in technology. For example, conventional Ethernet connected networks have given way in recent years to so-called Wireless Local Area Networks (WLAN) as the technologies enabling wireless communication have matured. Unfortunately, rapidly evolving technology has produced a proliferation of data communication systems and related technical standards and protocols. These disparate systems define different security mechanisms and algorithms. Each security mechanism and algorithm generally requires its own set of security keys.

In this regard, a brief review of some recent evolution in wireless network security standards is informative. A discussion of data privacy in contemporary wireless networks begins with the WLAN security standard known as (IEEE) 802.11. To a great extent, this standard enabled practical use of WLANs in home and small office environments, but proved inadequate for use in large enterprise settings. The security provided by the 802.11 standard just isn't commercial grade in relation to both data privacy and user authentication.

The data privacy mechanism provided by 802.11 is commonly referred to as Wired Equivalency Privacy (WEP) and implements an RC4 encryption algorithm. The RC4 encryption technique in and of itself is sufficiently strong to protect data, but its weak implemented within 802.11 only protects data from the most casual of eavesdroppers. This, coupled with the proliferation of readily available hacking tools, has resulted in WEP being generally discredited for use in enterprise environments.

The 802.1x standard was introduced to specifically address the security deficiencies inherent in 802.11. An upgraded data privacy mechanism referred to as Wi-Fi Protected Access (WPA) was included as part of this standard. WPA incorporates a so-called Temporal Key Integrity Protocol (TKIP) which implements a much stronger version of the RC4 encryption algorithm. As compared with WEP, TKIP changes that way security keys are derived, and rotates the keys more frequently for additional security. WPA does an excellent job of plugging the security holes apparent in WEP-enabled devices but it requires a firmware or driver upgrade to do so.

The 802.1x standard is actually a subset of the 802.11i standard. 802.11i includes two data privacy mechanism; WPA, and Robust Security Network (RSN). RSN provides data privacy using an Advanced Encryption Standard (AES) which is significantly stronger than the data privacy mechanisms provided by WEP and WPA. However, RSN will not run on legacy devices without a hardware upgrade. Thus, only the newest devices have the hardware required to accelerate the execution of the underlying RSN algorithm(s) to the point where its use becomes practical. Hence, WPA improves legacy device performance to an acceptable level, but RSN is probably the future of wireless data privacy for devices implementing 802.11i.

The difficult job of providing data privacy in a network is further complicated by the great variety of data being communicated. For example, 802.11e is a standard defining a set of Quality of Service (QoS) enhancements for local area networks, and in particular networks using the 802.11 standard. These enhancements are deemed critical for the transmission of delay-sensitive applications such Voice-over-IP and streaming multimedia. 802.11e adds an identifying header field to the transmitted data. This header defines the data's QoS (i.e., the data's relative priority within the network). Hence, 802.11e is just one more example of a data protocol resulting in data (and data packets) having a unique configuration.

The increasing variety of networks potentially capable of communicating with a mobile unit further challenges the respective data privacy mechanisms associated with the respective networks and mobile units operating within one or more of the networks. Ethernet and similarly hardwired networks are now joined by a multiplicity of WLANs, Wireless Personal Area Networks (WPANs), and Wide Area Metropolitan Networks (WMANs) (e.g. 802.16, WiBro, and/or WiMax-enabled networks).

Consider the simple example shown in FIG. 1. A mobile unit 1 (e.g., a handheld device, a handheld personal computer (PC), a portable or laptop computer, a Personal Digital Assistant (PDA), a mobile or cellular telephone, a wireless Internet device, a protocol-enabled telephone, a portable wireless device, a handheld remote control, or an asset management tag) may be independently capable of receiving data from an Ethernet connected network 5, a WMAN 2, a WLAN 3, or an Ad Hoc network 4. Worse yet, the mobile unit may pass through one or more of the wireless networks as the unit is physically moved or altered in its operating mode. Further, the possibility exists for the mobile unit to be simultaneously connected within two or more networks. For example, a laptop computer might be able to receive data related to a business account from a WLAN (or an Ethernet connected network) while being simultaneously enabled to receive data related to a personal account from a WMAN.

In such circumstances, multiple networks are capable of transmitting data to a single mobile unit. The mobile unit must, therefore, be able to distinguish between data from the plurality networks, and properly apply the data privacy mechanism(s) and method(s) associated with the respective networks. At a minimum, the mobile device must be able to properly encrypt and decrypt data related to the different networks.

Since each network uses a different security key or set of security keys, the mobile unit must provide some ability to store a plurality of security keys and the some additional ability to search through the stored plurality of security keys. This is no mean feat since sophisticated networks typically use a data privacy mechanism relying on a large number of security keys.

SUMMARY OF THE INVENTION

Recognizing the need for an improved mechanism providing one or more appropriate security key(s) in response to potentially multiple network connections, one embodiment of the invention provides a mobile unit including a Key Search Engine (KSE). The KSE generally receives search criteria from a network and provides a desired security key in response thereto. The KSE includes a memory system storing a plurality of security keys, wherein the memory system comprises in one embodiment, an associative memory providing an index output in response to index data derived from the search criteria, and a memory outputting the security key in response to the index output.

The KSE may include a KSE control block to receive the search criteria and to derive the index data. The search criteria may include data packet information related to a data packet received in the mobile unit, and/or auxiliary information related to an element in the network. The auxiliary information may include control option information related to a user-defined option selection.

In one related embodiment, the KSE control block also includes an Input/Output block receiving search criteria and outputting the security key, an associative memory interface connecting the KSE control block with the associative memory, and a memory interface connecting the KSE control block with the memory. The KSE control block may also includes an index selector to derive the index data in response to the search criteria.

In one related embodiment, the index selector includes a register block and a mapper. The register block may include a reconfigurable register adapted to output index data of varying size or character in response the mapper's output. The mapper may be implemented, for example, using a mapping table or a finite state machine.

The plurality of security keys stored in the memory system may include one or more default keys in which case the memory system may include a default memory storing the default key(s).

The security key output by the RKSE may include multiple components in which case the memory may be formed by multiple memories each storing one or more of the multiple components. In one example, the multiple components include an encryption/decryption key, a cipher, and/or an Initialization Vector (IV). In another example, the multiple components include a Security Association Identifier (SAID), a Traffic Encryption Key (TEK), a Security Association (SA), and/or an Initialization Vector (IV).

In one related embodiment, the associative memory comprises one or more Content Addressable Memories (CAMs).

In yet another related embodiment, the KSE may include an index operation block to receive index criteria derived from the search criteria and the index output from the associative memory. From at least these two inputs, the index operation block may generate a memory address to be applied to the memory. The index operation block may include, for example, a circuit performing concatenation, hashing, or some other logical operation.

In another embodiment, the invention provides a mobile unit adapted to connect within a first network communicating data in accordance with a first protocol, and a second network communicating data in accordance with a second protocol. The mobile unit may include a Reconfigurable Key Search Engine (RKSE), comprising a control block and a memory system storing a plurality of security keys related the first and second networks. The control block outputs a security key selected from the plurality of security keys in response to search criteria comprising at least data packet information received by the mobile unit.

In this context, either one of the first network and second network may be a Wireless Local Area Network (WLAN), a Wireless Metropolitan Area Network (W MAN), or an Ad-hoc network.

The memory system in this embodiment may also include an associative memory receiving index data derived from the search criteria from the control block and outputting an index output. The memory system may also include a memory receiving a memory address derived from the index output, and outputting the security key in response to the memory address.

The index output may indicate a HIT condition if the index data identifies at least one associative memory entry, or a MISS condition if the index data fails to identify an associative memory entry. Where a related embodiment of the invention includes a memory system having a default memory, the memory address resulting from the index output is applied to the default memory when a MISS condition is indicated. Otherwise, the memory address is applied to the memory when a HIT condition is indicated.

In another related embodiment, the default memory is a hierarchical memory comprising multiple default memories storing related components of the security key, wherein the multiple default memories are responsive to a received memory address.

In yet another related embodiment, the hierarchical memory includes multiple memories storing related components of the security key, wherein the multiple memories are responsive to the received memory address.

In a specific embodiment, the memory system includes a first Content Addressable Memory (CAM) receiving first index data from a KSE control block and outputting a first index output, a first memory receiving a first memory address derived from the first index output and outputting a first security key component output, a second CAM receiving second index data derived in relation to data associated with the first security key component and outputting a second index output, and a second memory receiving the second index data and outputting a second security key component.

In another embodiment of the invention, the mobile unit may include first circuitry adapted to communicate with a WMAN and second circuitry adapted to communicate with a WLAN, wherein the first and second circuitry commonly access a RKSE to obtain a respective security key. In this context, the plurality of security keys may include a plurality of WLAN security keys, and/or a plurality of WMAN security keys.

The foregoing embodiment may also include a radio frequency receiver receiving a data packet. Hence, the RKSE may output a WLAN security key selected from the plurality of WLAN security keys where the received data packet originates from the WLAN, may output a WMAN security key selected from the plurality of WMAN security keys where the received data packet originates from the WMAN.

The invention is, however, not restricted to mobile units or methods of use for a mobile unit with one or more networks. Instead, one embodiment of the invention provides a Key Search Engine (KSE) comprising a KSE control block receiving search criteria from a network, deriving index data from the search criteria, and providing a security key. The KSE further comprises a memory system storing a plurality of security keys. The memory system may include an associative memory to provide an index output in response to the index data, and a memory to output the security key in response to the index output.

As above, the search criteria may include data packet information, auxiliary information, and/or control option information.

In another embodiment, the invention relates to a method of providing a security key in a mobile unit. The mobile unit may include a Key Search Engine (KSE) and memory system, the memory system including an associative memory, and a memory storing a plurality of security keys. The method may include receiving search criteria from a network, deriving index data from the search criteria in the KSE, searching the associative memory using the index data to generate an index output, and referencing the memory using the index output to output the security key.

Receiving the search criteria may include receiving data packet information related to a data packet received in the mobile unit, and may further include receiving auxiliary information related to an element in the network. The auxiliary information may include control option information related to a user-defined option selection.

Deriving the index data may include configuring a register in an index selector in accordance with a mapping operation executed in the KSE, and thereafter deriving the index data using the register. The mapping operation may be implemented, for example, using a mapping table or a finite state machine.

Where the plurality of security keys includes a default key, and the memory system comprises a default memory storing the default key, one related embodiment of a method according to the invention references the default memory using the index output to output the default key. Here again, embodiments of the invention may use a security key comprising multiple components. This being the case, the memory may include multiple memories storing one or more of the multiple components, and the method includes referencing the multiple memories using the index output to output the multiple components.

Where the foregoing KSE comprises an index operation block, a related exemplary method references the memory by deriving index criteria from the search criteria, performing an index operation on the index output and index criteria in the index operation block to generate an address and referencing the memory using the address to output the security key. The index operation may be a concatenation, a hashing, or some other logical operation.

Another exemplary method according to the invention provides a security key related to a first protocol used by a first network or a second protocol used by a second network. This method includes storing a plurality of security keys related to at least one of the first and second protocols in a memory system. The memory system comprising an associative memory and a memory. In the method, upon receiving data packet information and auxiliary information, search criteria is defined in relation to the data packet information and auxiliary information, index data is derived from the search criteria, the associative memory is referenced using the index data to output an index output, and the memory is referenced using the index output to output the security key.

Where the foregoing memory system further comprises a default memory, the step of searching the associative memory may include indicating a MISS condition where no associative memory entry is related to the index data, and a HIT condition where at least one associative memory entry is related to the index data. Thereafter, the step of referencing the memory using the index output comprises, referencing the default memory using the index output when a MISS condition is indicated, or referencing the memory using the index data when a HIT condition is indicated.

In a related embodiment, the step of referencing the memory using the index output includes deriving index criteria from the search criteria, performing an index operation using the index criteria and the index output to output an address, and referencing the memory using the address.

For one embodiment, defining the search criteria in relation to the data packet information and auxiliary information comprises retrieving stored control option information.

In another embodiment, deriving the index data from the search criteria comprises configuring a register in a first configuration where the received data packet originates from the first network or configuring the register in a second configuration where the received data packet originates from the second network.

In still another embodiment, the invention provides a method of operating a mobile unit adapted to connect to a first network using a first protocol and a second network using a second protocol. The method includes selecting user-defined control options, defining control option information in relation to the selection of user-defined control options, and identifying a security key from a plurality of stored security keys related to the first and second networks in relation to the control option information.

The user-defined control options may be selected by a retailer selling the mobile unit or and end user of the mobile unit.

The first network may be a Wireless Local Area Network (WLAN), and the second network may be a Wireless Metropolitan Area Network (WMAN) or an Ad-hoc network.

In a related embodiment, the memory system is a hierarchical memory system, and the step of identifying a security key from a plurality of stored security keys related to the first and second networks in relation to the control option information comprises searching the hierarchical memory system using a first searching algorithm when the received data packet originates from the first network, or searching the hierarchical memory system using a second searching algorithm when the received data packet originates from the second network.

Where the hierarchical memory system comprises in one embodiment, an associative memory, a memory, and a default memory, then one or both of the first searching algorithm and second searching algorithm may search the default memory.

Either of the first searching algorithm or second searching algorithm may be a cascaded search through the hierarchical memory system.

In yet another embodiment, the invention provides a method of operating a mobile unit adapted to connect to multiple networks. The method includes receiving a first data packet from a first network, and thereafter in a Reconfigurable Key Search Engine (RKSE) assuming a first data privacy configuration enabling a first searching algorithm through a memory system storing a plurality of security keys, and receiving a second data packet from a second network, and thereafter in the RKSE assuming a second data privacy configuration enabling a second searching algorithm through the memory system storing the plurality of security keys.

The first and second data privacy configurations may be respectively defined in relation to auxiliary information related to the mobile unit or an element in one of the multiple networks. Further, the auxiliary information may include control option information defined in accordance with selections of user-defined control options. For embodiments where the memory system is a hierarchical system comprising an associative memory and a memory, these memories are respectively searched by the first and second searching algorithms.

Another embodiment of the invention additionally provides for a method that outputs a first security key in response to the first searching algorithm and processes the first data packet in relation to the first security key. Similarly, this method outputs a second security key in response to the second searching algorithm and processes the second data packet in relation to the second security key.

In one embodiment, the foregoing first network is a Wireless Local Area Network (WLAN), and the first security key includes an encryption/decryption key, a cipher, and/or an Initialization Vector (IV). The WLAN related first security key might also take the form of a default key.

In a related embodiment, the foregoing second network is a Wireless Metropolitan Area Network (WMAN), and the second security key includes a Security Association Identifier (SAID), a Traffic Encryption Key (TEK), a Security Association (SA), and/or an Initialization Vector (IV).

In yet another embodiment, the invention provides a wireless network unit adapted to communicate packet data with a Wireless Local Area Network (WLAN) and a Wireless Metropolitan Area Network (WMAN). It comprises a WLAN controller receiving WLAN data packet, a WMAN controller receiving WMAN data packet, and a Key Search Engine (KSE) commonly accessed by the WLAN and WMAN controllers. The KSE provides a security key in response to WLAN packet information and WMAN packet information.

In a related embodiment, the KSE includes a memory system storing a plurality of security keys related to the WLAN and WMAN, and a KSE control block adapted to search the memory system using a first searching algorithm in response to WLAN packet information and a second searching algorithm in response to WMAN packet information.

The WLAN controller, the WMAN controller, and the KSE may be implemented on a common printed circuit board (e.g., a PCI card), in a single integrated circuit, or in a chip set.

BRIEF DESCRIPTION OF THE DRAWINGS

The invention is described below in relation to several embodiments illustrated in the accompanying drawings. Throughout the drawings like reference numbers indicate like exemplary elements, components, or steps. In the drawings.

DESCRIPTION OF THE EXEMPLARY EMBODIMENTS

Figure 1:
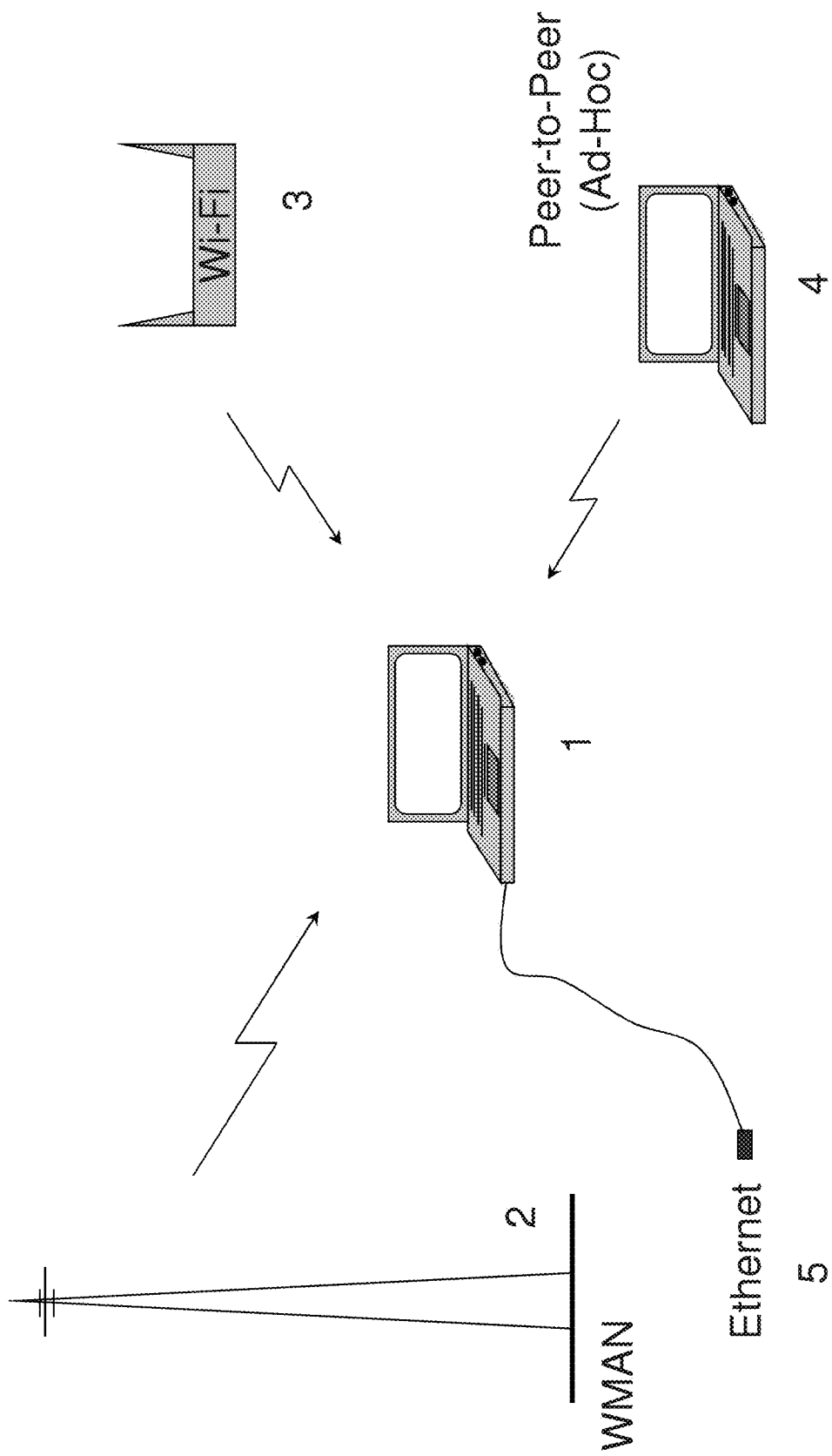
FIG. 1 illustrates one general operating context for the invention, and more particularly, a mobile unit adapted to the invention.

Exemplary embodiments of the invention are described below with reference to the corresponding drawings. These embodiments are presented as teaching examples. The actual scope of the invention is defined by the claims that follow.

In general application, embodiments of the invention provide a mobile unit adapted for operation within one or more networks, wherein the mobile unit comprises a circuit, a mechanism, and/or functionality capable of efficiently storing a plurality of security keys. In a related aspect, embodiments of the invention further comprise a circuit, a mechanism, and/or functionality capable of identifying, adaptively searching for, and/or selecting a security key from amongst the stored plurality of security keys. Examples of a "security key" include any one or more of an encryption/decryption key, a cipher, an authentication vector (IV), a security code block, and/or a digital signature or security vector.

The term "mechanism" is used throughout this description in its broadest sense. Thus, any hardware, software, firmware, or combination of hardware, software, and/or firmware implementing data privacy, in whole or in part, is termed a "data privacy mechanism." A data privacy mechanism may include, be defined by, or rely upon network defined parameters (including settings, functionalities, inputs, and/or modes of operation), mobile unit defined parameters, and/or user defined parameters.

The term "memory" as used throughout this description to denote any circuit or medium capable of storing data. This term includes, without loss of generality, volatile memory circuits such as Dynamic Random Access Memory (DRAM), and non-volatile memories such as Static Random Access Memory (SRAM), flash memory, and magnetic memory. The term memory should not be read as suggesting any particular physical implementation or hardware defined boundaries. For example, "a memory" may actually be formed by the combination of one or more integrated circuits. Similarly, two or more "memories" may be implemented in a single integrated circuit. That is, a combination of specific memories may be defined and/or used for different purposes within a single integrated circuit or a chip set of related integrated circuits. Further, the term "memory" presupposes continued technical evolution in the design and fabrication of circuits and media capable of storing data.

The term "memory system" broadly describes a plurality of memories and related access circuitry, whether such a plurality of memories is defined by two or more memories separately designated by their physical form, functionally use, purpose, or type.

The making and use of the invention are well illustrated in relation to wireless networks, although the invention finds ready application in wired networks as well. Accordingly, much of the description that follows will be made in the context of wireless networks and wireless network operation.

Consider, for example, the contemporary problem of multiple Internet Service Providers (ISPs), private wireless service providers, and/or other mobile units transmitting/receiving data to/from a particular mobile unit. Each of the wireless networks communicating data to/from the mobile unit may take the form of a WLAN, WMAN, or WPAN. Data privacy is an issue for all wireless service providers and most network users, since wireless networks by their vary nature are open broadcast-type systems. That is, absent an effective data privacy feature—a wireless network generally allows an interloper to access data being broadcast between the network and a user. Yet as noted above, different wireless networks use different data privacy mechanisms. These different data privacy mechanisms implicate different data encryption/decryption algorithms and protocols that use different security keys.

Thus, in order to enable a mobile unit to operatively migrate across a plurality of wireless networks, where each wireless network has its own data privacy mechanism, the mobile unit requires at least two things: a memory adapted to store a plurality of security keys, and a circuit (or mechanism) adapted to search through the stored plurality of security keys and select an appropriate security key for a particular data packet received from a given network. This circuit (or mechanism) will be generically referred to hereafter as a "key search engine."

Contemporary wireless networks communicate information by transmitting and receiving data packets. A data packet is typically a predetermined quantity of data including some form of packet identification. A body of information to be transmitted is normally divided into a plurality of data packets. The resulting data packets are then transmitted via the network and reassembled prior to consumption by a user. There are many different types of data packets and many different protocols controlling the division of information into data packets, the identification of data packets within a network, the checking and correction of errors within the data packets, and the reassembly of data packets into consumable information. This variety of data packet types and data communication protocols further complicates the issue of data privacy for a mobile unit capable of receiving information from plurality of different networks, each transmitting data packets having potentially different configurations.

Recognizing the reality of different data packet configurations received from different networks, and further recognizing the potential for different user defined modes of operation for a mobile unit, one embodiment of the invention provides a reconfigurable key search engine. The reconfigurable key search engine allows security keys stored in a memory associated with a mobile unit to be searched in accordance with information derived from various sources, including, for example, one or more received data packets, information related to the transmitting/receiving network, and/or information related to user defined settings or modes of operation for the mobile unit.

In a more specific embodiment, the present invention provides a key search engine capable of dynamically assuming multiple security mode configurations (e.g., reconfiguring its internal search operation(s) in response to multiple data privacy mechanism requirements). Each security mode configuration is typically associated with a specific data privacy mechanism. That is, a first network (e.g., a WLAN) communicating data packets to a mobile unit uses a first data privacy mechanism (e.g., one implementing WEP). When a first data packet received in the mobile unit is identified as being transmitted from the first network, the key search engine initiates a first security mode configuration adapted to identify a first security key associated with the first data privacy mechanism.

Subsequently, a second data packet is received in the mobile unit from a second network (e.g., a WMAN) using a second data privacy mechanism (e.g., one designed in accordance with 802.16). Upon recognizing that the second data packet originates from the second network, the key search engine initiates a second security mode configuration adapted to identify a second security key associated with the second data privacy mechanism.

Different security mode configurations generally implicate different data register configurations, software routines, and/or hardware/firmware operations and executions within the circuitry and related software implementing the key search engine. So, the mobile unit in the foregoing example having a key search engine implemented in accordance with the invention is able to readily communicate with the first network (WLAN) in the first security mode configuration and with the second network (W MAN) in the second security mode configuration.

Further recognizing the need for a considerable number of security keys, embodiments of the invention provide a memory system adapted to store a large number of security keys in an efficiently searchable manner. In one more specific embodiment, the memory system is a hierarchal memory. More particularly, one or more associative memories or content addressable memories may be used to store a plurality of security keys, or memory addresses (or vectors) associated with a plurality of security keys stored in an associated memory. Exemplary memory system embodiments will be described in some additional detail hereafter.

However, before proceeding with a more detailed description the key search engine, associated memories, or other related aspects of the invention, some additional system context would be beneficial. Consider the diagram of wireless networks shown in FIG. 2. Three distinct wireless networks are shown as examples. These networks include an Ad-Hoc system (e.g., a peer-to-peer or infrastructure-less system represented here as Independent Basic Service Set—IBSS), a first wireless infrastructure network (BSSa), and a second wireless infrastructure network (BSSb).

The first and second wireless infrastructure networks generally include one or more Access Points (AP) connected to a distributed data communications system (DS) and potentially one or more related data servers (SRV). A plurality of mobile units (MUs) communicate with an AP and possibly with one another within BSSa and BSSb, respectively. In contrast, the IBSS comprises only MUs communicating directly with one another without an intervening AP.

Figure 2:
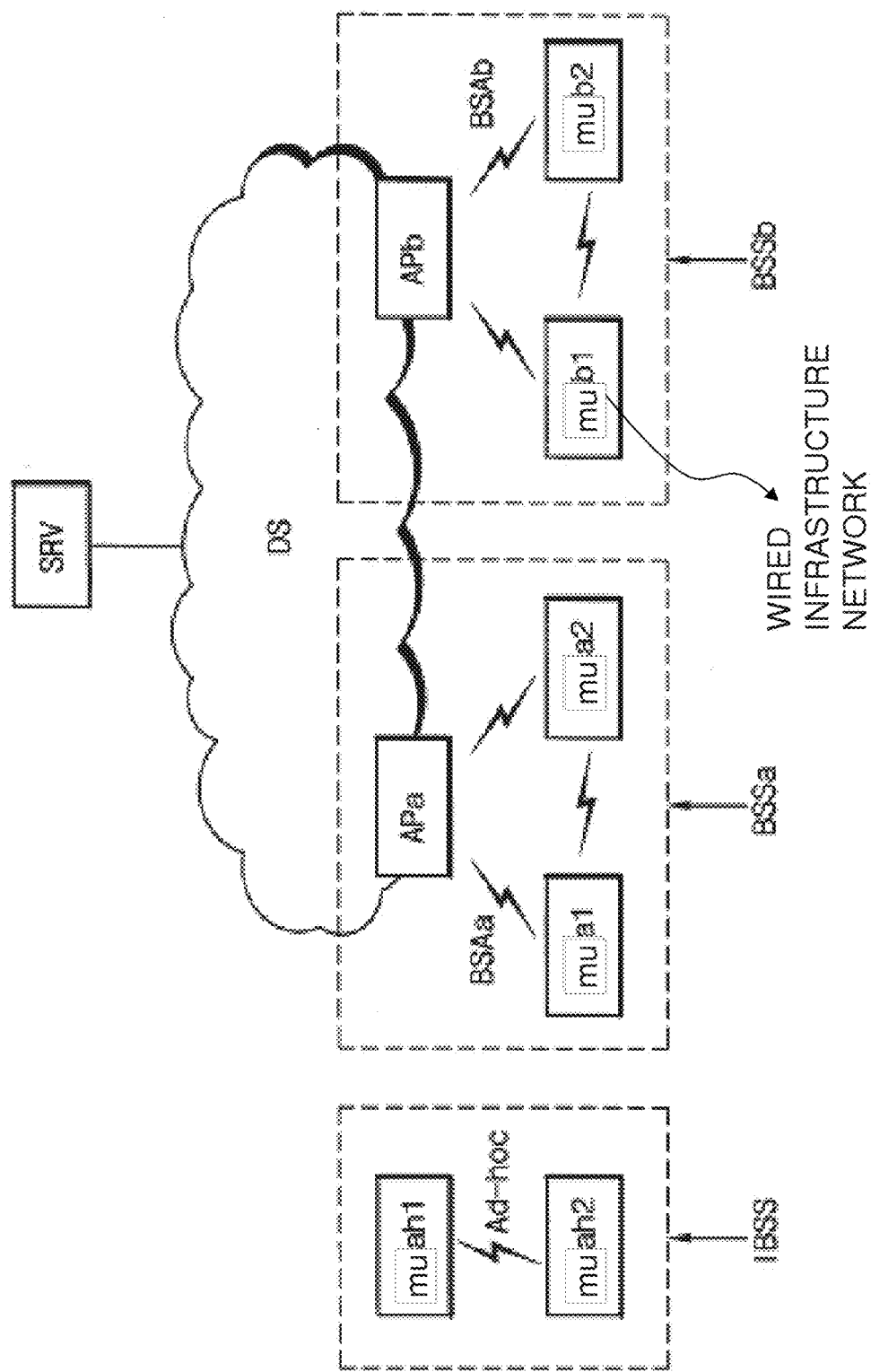
FIG. 2 further illustrates another general operating context for the invention, and more particularly a mobile unit adapted to the invention.

Certain applications of the invention can be understood within the context of this arrangement of networks. For example, as a mobile unit migrates between BSSa, BSSb, and/or IBBS, it requires access to different security keys for each network. A mobile unit may effectively "migrate" between networks by either being physically moved from a first wireless network coverage area to a second wireless network coverage area, and/or by changing its mode of operation (e.g., connecting an Ethernet cable, linking in an Ad Hoc network, etc.) Moreover, the networks are illustrated in FIG. 2 for purposes of clarity as being distinct, but in many practical circumstances the wireless coverage areas associated with BSSa, BSSb, and IBBS will overlap in whole or in part.

In this regard, the invention contemplates simultaneous connection of a mobile unit within two or more networks. For example, MUa1 might be connected within BSSa through APa and might also be peer-to-peer connected to MUah2 within the IBSS. As another example, MUb1 might be connected within BSSb through APb, connected to a wired infrastructure network via a hardwire connection, and also connected within BSSa through APa. Each one of BSSa and BSSb might be configured for operation in one of any number of specific configurations, including for example a WLAN or a WMAN. Regardless of the particular network configuration(s), where a mobile unit is simultaneously connected to two or more networks, it requires the ability to dynamically and adaptively identify an incoming/outgoing data packet and obtain an appropriate security key in order to properly decrypt/encrypt it.

To more fully appreciate the extent of the data privacy issue confronting a mobile unit capable of transparently migrating between different networks or simultaneously connecting within multiple networks, one must consider the very real possibility that each network will use a different data privacy mechanism having a unique encryption/decryption algorithm and a different data communication protocol. Embodiments of the invention provide a system, circuit, mechanism, and/or methods of operation through which a mobile unit may migrate between different networks or simultaneously connect with multiple networks.

One specialized circuit, the reconfigurable key search engine (RKSE), will first be considered in relation to these embodiments. An exemplary RKSE will be described in relation to a mobile unit shown in FIG. 3. As with any encryption/decryption mechanism, the invention presupposes two ends of a data encryption/decryption process. That is, data packets received and decrypted by a mobile unit must first be encrypted and transmitted by some other network element (e.g., an AP or another mobile unit). Accordingly, where the RKSE is described in the context of a mobile unit, for example, it is understood that a similar circuit or analogous functionality must exist in an AP, another mobile unit, or similar network element. However, given the physical differences (e.g., size, power, operating environment) between a mobile unit and a fixed network element, such as an AP, it is certainly possible that the RKSE will be implemented in different forms as between these two network elements.

Figure 3:
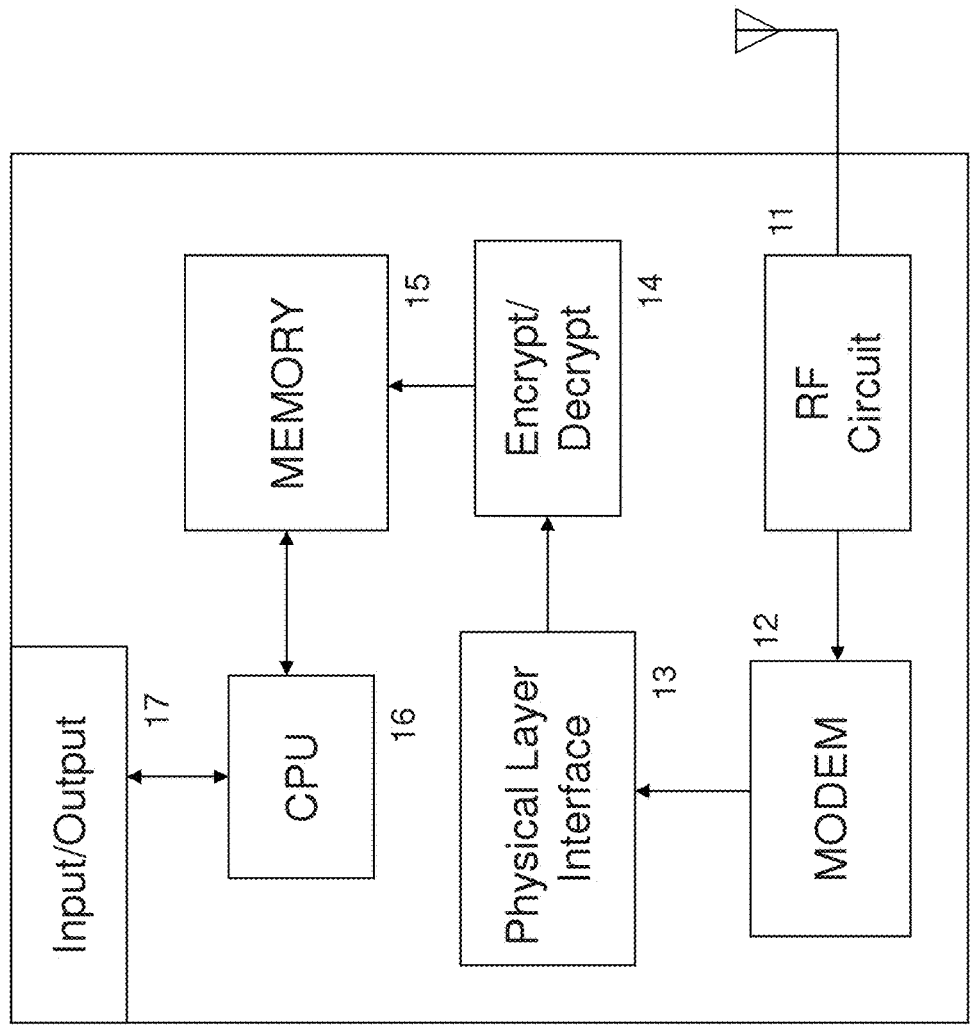
FIG. 3 illustrates one general embodiment of a mobile unit capable of incorporating a Reconfigurable Key Search Engine (RKSE) according to the invention.

Looking at FIG. 3, mobile unit 10 generally includes an RF (or IR) circuit 11 receiving data packets communicated via a radio frequency (or infrared) link, and a modem 12. From modem 12, data is passed to a physical layer interface (PLI) 13. PLIs come in a myriad of forms and types, but generally accept data extracted from the received RF (IR) signals as provided by modem 11, and thereafter form (or re-form) a data packet for consumption by a encrypt/decrypt circuit 14 and/or a CPU 16.

One related method of operation for exemplary mobile unit 10, allows decryption of incoming data packets "on-the-fly." In this method, data packets provided by PLI 13 are passed to a competent encrypt/decrypt circuit 14 which applies an appropriate security key to decrypt the information contained in the data packet. Once the data packet is decrypted, it is stored in memory 15 for subsequent consideration or processing by CPU 16. CPU 16 typically passes many decrypted data packets to a host system via an Input/Output circuit 17 (e.g., a PCI card). The arrows in FIG. 3 show this general flow of data through mobile unit 10. Data packets to be encrypted and transmitted by mobile unit 10 will generally traverse this path in reverse.

Alternatively, data packets from PLI 13 may first be stored in memory 15 and thereafter sent to encrypt/decrypt circuit 14 for decryption.

Within this general example of a mobile unit, an RKSE implemented in accordance with the invention may be incorporated, for example, within the encrypt/decrypt circuit 14, or as a separate circuit responsive to CPU 16, or even within the functionality provided by CPU 16 itself (e.g., a multi-core processor).

Figure 4:
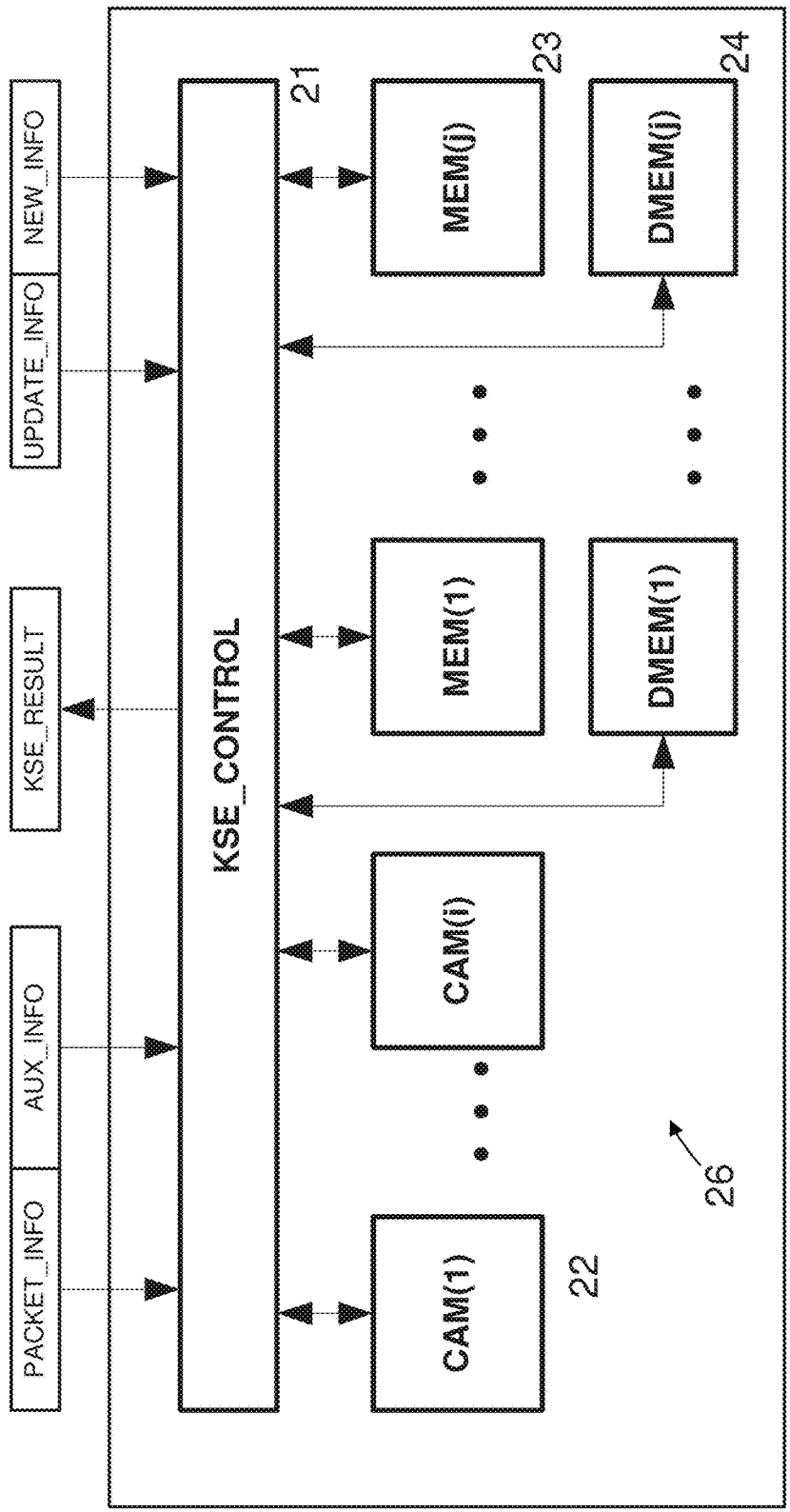
FIG. 4 is a block diagram illustrating one embodiment of a RKSE according to the invention.

An exemplary RKSE 20 is illustrated in the block diagram of FIG. 4. The general blocks shown in this diagram have been selected to effectively describe certain functionality and components associated with RKSE 20. The respective "blocks" are not intended to define mandatory hardware types or to establish fixed boundaries between related circuits. Indeed, the invention recognizes that many specific implementations and adaptations may be made in relation to the disclosed embodiment. However, returning to FIG. 4, RKSE 20 generally comprises a key search engine (KSE) control block 21, and a memory system 26 comprising an associative memory block 22, a memory block 23, and a default memory block 24.

KSE control block 21 will be described in some additional detail with reference to FIG. 5.

In one related embodiment, associative memory block 22 comprises one or more Content Addressable Memories (CAM). A CAM is a conventionally understood memory element typically used for high speed searching applications. Unlike standard memory (e.g., random access memory or RAM) in which the memory returns specific data stored in memory cells associated with a specific memory address, a CAM is designed to search its entire memory in relation to a supplied dataword, hereafter referred to as "index data." The index data may be identified in relation to all or part of one or more data entries stored in the CAM.

In response to the supplied index data, the CAM generally returns one or more memory addresses associated with CAM data entries containing the index data. In some applications, the CAM also returns other data associated with CAM entries containing the index data. Thus, a CAM may be viewed in one context as the hardware equivalent of a software-provided associated data array. Because a CAM is designed to search its entire memory in a single operation, it is usually much faster than a RAM memory of similar size.

CAMs come in a variety of architectural variants. The binary CAM is the simplest variant which uses index data formed entirely of logical 1s and 0s. The ternary CAM is a more advanced variant which allows the use of index data having one or more constituent bits with a third logical matching state of "X" or "Don't Care." The use of Don't Care bits within the index data adds considerable flexibility to the CAM's searching capabilities.

Memory block 23 and default memory block 24 may comprise one or more conventional memory elements, including associative type memory elements.

RSKE 20 generally receives "search criteria" which is used by KSE control block 21 to derive index data subsequently applied to at least associative memory block 22. Search criteria may be obtained from one or multiple data sources of a system designer's selection. In one embodiment of the invention, however, search criteria comprises information (e.g., parameters, data, flag(s) or register indication(s), variable definition(s), address(es), etc.) derived from a received data packet, and/or information relating to one or more network elements (e.g., the mobile unit's identity and/or related parameter(s), a connected AP or other mobile unit identity, CoS indication, security designations, network parameters, etc.). Information of any variety derived from a received data packet and received in KSE control block 21 as search criteria will hereafter be termed "data packet information" (PACKET_INFO). Information related to one or more network elements received in KSE control block 21 as search criteria will here after be terms "auxiliary information" (AUX_INFO). It is certainly possible that auxiliary information might be received in a mobile unit via a communicated data packet. However, auxiliary information relates to the network and network elements, as opposed to data packet information which relates to the actual data in a data packet.

One specific form of auxiliary information contemplated for use within a RSKE operating in accordance with one embodiment of the invention is termed "control option information." Control option information is optionally provided with auxiliary information is response to one or more specific user settings associated with a mobile unit. That is, the invention optionally allows for the definition of certain control parameters in response to user selected indications in the operation of a mobile unit. Where applied, such control option information becomes part of the search criteria applied to KSE control block 21, and is optionally used to define index data applied to at least associative memory block 22.

RSKE 20 generally outputs one or more security keys (KSE_RESULT) in response to received search criteria. The output "security key" may include an encryption and/or decryption key, one or more cipher(s), initialization vector(s) (IV), digital signatures, as well as any other security related data.

Further, under defined error conditions RSKE 20 will return one or more error message(s) in response to the received search criteria.

Optionally, RSKE 20 also receives as inputs two signals indicated in FIG. 4 as UPDATE_INFO and NEW_INFO. These optional signals will be discussed in context below.

Figure 5:
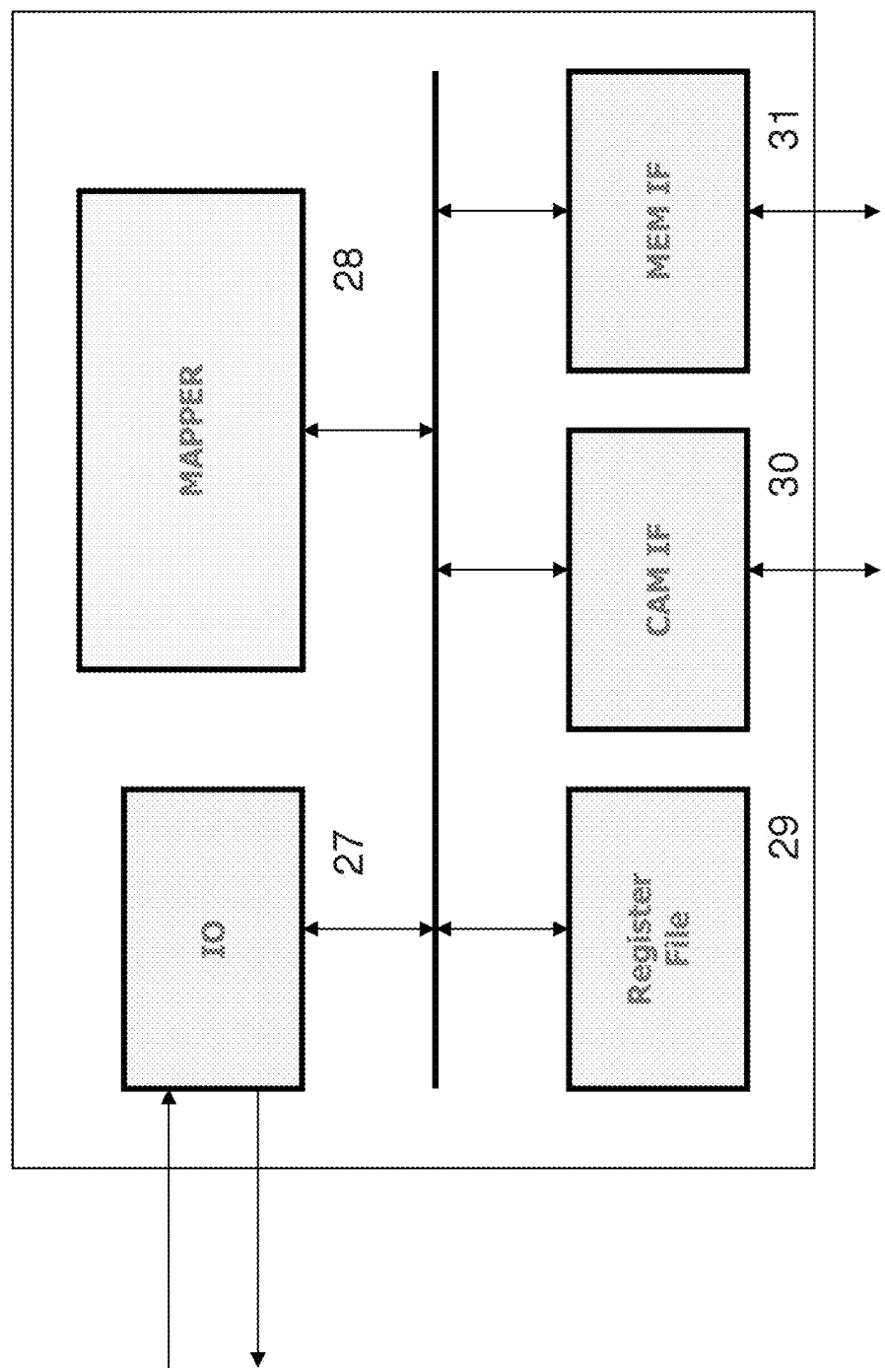
FIG. 5 is a block diagram illustrating one embodiment of the KSE control block shown in FIG. 4 in some additional detail.

KSE control block 21 shown in FIG. 4 is shown in some additional detail in the block diagram of FIG. 5. Here again, the blocks are presented to illustrate certain functional capabilities and generalized circuits and/or software routines associated with the KSE control block 21.

Some form of Input/Output (I/O) control is generally required. Accordingly, at least some form of search criteria will be input to KSE control block 21 and at least a security key or an error message will be correspondingly output through I/O block 27.

One or more competent memory interfaces is generally required between KSE control block 21 and associative memory block 22, memory block 23, and/or default memory block 24. Hence, the example shown in FIG. 5 includes a CAM interface (CAM IF) 30 and a memory interface (MEM IF) 31. These interfaces need not be separately provided, but may be implemented using a common memory interface circuit or chip set.

In addition to general input/output and memory interface capabilities, one embodiment of KSE control block 21 comprises register block 29 and a mapper 28. Register block 29 is typically implemented using a collection (or set) of hardware data registers adapted to select, process, and/or store data. One or more of these registers may be reconfigurable under the control of related software. The term "reconfigurable" is broadly used to describe any circuit, mechanism or method whereby one or more hardware registers are enabled to receive and effectively operate on a data word of variable size and/or definition. In one possible approach, a CPU controlling the RSKE may write a control command to the RSKE which has the effect of defining the size, character, and/or content of a data word to be received, stored, operated upon, and/or output by one or more data registers. Hence, the term "reconfigurable search key engine" encompasses all circuit and mechanisms capable of searching for one or more security keys stored in a memory in response to search criteria resulting in index data potentially having a variable size and/or character. In one embodiment, register block 29 contains a register capable of receiving index data that varies in size and/or character in relation to variations in the received search criteria. Such variation in search criteria may result, for example, from different types of data packets received from different networks, or from different elements within a particular network (e.g., an Ad-hoc network).

Register block 29 may also include certain specialty registers designated to store specific information. For example, a user mode register may store information related to user defined options for the mobile unit. Certain address registers may be used to store pointers indicating address locations that require replacement or update.

Mapper 28 may include a mapping table, a finite state machine, or similar functionality sufficient to perform mapping operation(s) in accordance with, for example, received search criteria, and data stored in associative memory block 22, memory block 23, and/or default memory 24.

In related embodiments of the invention appropriate selection and application of search criteria to the RSKE allows for a potential reduction in the number of entries stored in memory. That is, the compound use of an "index output" from the associative memory block and one or more portions of the search criteria selected as "index criteria" enable the efficient location of a desired security key from a great plurality of possible security keys stored in memory.

Figure 6:
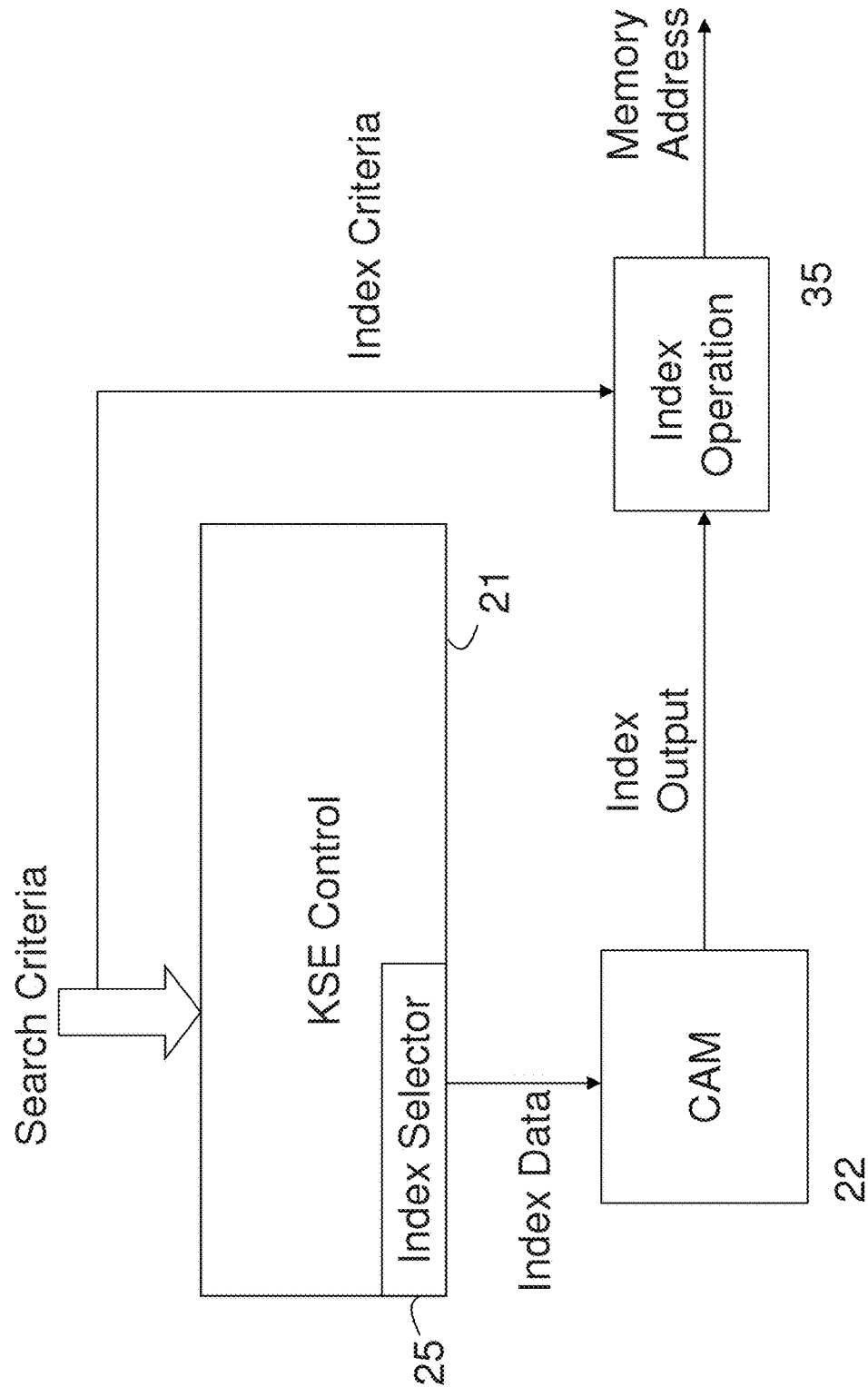
FIG. 6 is a diagram illustrating a logic flow for an exemplary search method related to a RKSE according to the invention.

The model system shown in FIG. 6 further illustrates this point. Here, search criteria is applied to KSE control block 21, and an index selector 25 circuit or mechanism derives index data from the search criteria. All or some selected potion of the search criteria is applied to an index operation block 35 as "index criteria." The index data derived by index selector 25 is used to find one or more entries in associative memory block (e.g., a CAM) 22. The one or more CAM entries are output as an "index output" to index operation block 35. Index operation block performs some logical or mathematical operation(s) on the received inputs (e.g., at least the index criteria and the index output) in order to generate a memory address identifying a security key stored in memory block 23 or default memory block 24.

In this regard, as will be described in some additional detail hereafter, memory block 23 and/or default memory block 24 may be hierarchical memories storing one or multiple components related to a specific security key.

The index selector 25 indicated in FIG. 6 may take the form of register 29 and/or mapper 28 shown in FIG. 5, or may take the form of a simple hardwired circuit, a static, dynamic, and/or programmable mechanism, including such devices as a matrix, shift register, and other selection devices to selectively extract index data and/or index criteria from the search criteria. The index data may be viewed in one context as a "lookup word" for the associative memory block 22. In one embodiment, the index criteria comprises only a small number of data bits selected or derived from the search criteria.

Index operation block 35 may manipulate the index output and index criteria (and potentially other inputs) in many possible ways to produce a resulting memory address. For example, these two inputs may be concatenated together to form the memory address. Alternatively, index operation block 35 may perform a hashing operation using the inputs to generate the memory address. Indeed, index operation block 35 may be omitted entirely where the index output and index criteria are merely applied to a related memory as address line signals.

The use of an index output generated from an associative memory block 22 based on index data derived from search criteria by an index selector 25 in the KSE control 21 together with an index criteria selected or derived from the search criteria allows for great flexibility and efficiency in the generation of a memory address associated with a desired security key. That is, a broad range of possible search criteria may be received in the RSKE in relation to multiple networks, different protocols, and/or different data packet configurations. From this broad range of possible search criteria, the KSE control block is able to intelligently derived appropriate index data and index criteria using, for example, a reconfigurable register set/mapper combination or similar index selector mechanism.

Figure 7:
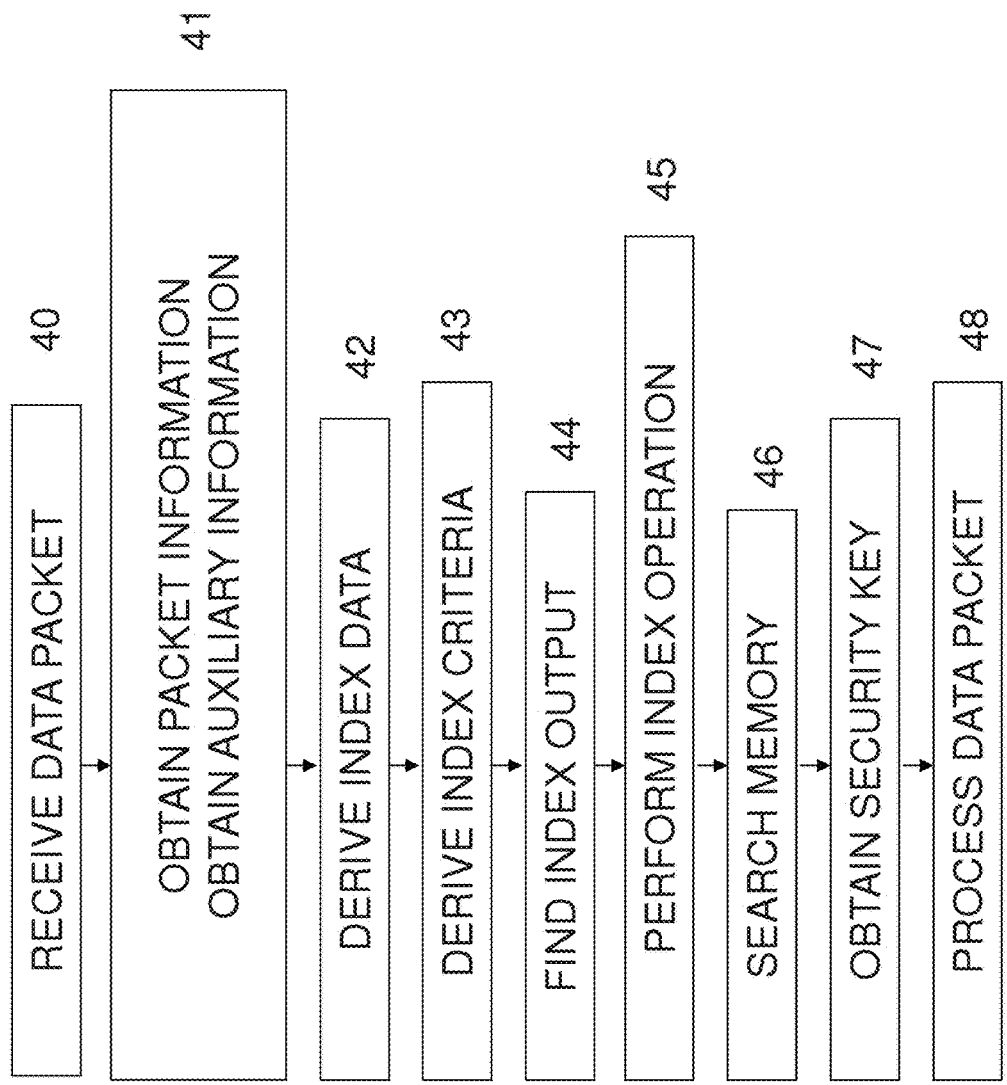
FIG. 7 is a flowchart illustrating another exemplary search method related to a RKSE according to the invention.

The flowchart shown in FIG. 7 expands upon the foregoing discussion. Assuming a mobile unit having a RKSE implemented in accordance with invention, an exemplary method begins when a data packet is received by the mobile unit (40). Upon receiving the corresponding data packet information and related auxiliary information (41), the RKSE is able to derive the index data (42) and the index criteria (43). The index data is used to find a corresponding index output stored in an associative memory (44). With the index output and the index criteria, the RKSE performs the index operation to generate a memory address (45) and thereafter searches memory (46) to obtain one or more a security keys (47). With the appropriate security key in hand, the RKSE is able to process the received data packet (48).

Figure 8:
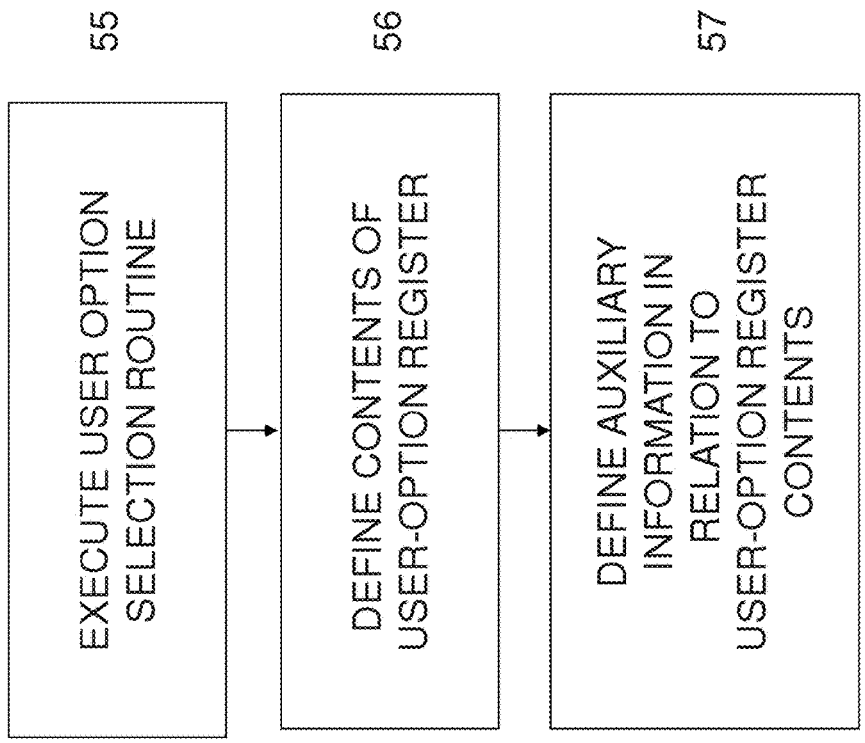
FIG. 8 is a flowchart illustrating one related aspect of an exemplary search method adapted to a RKSE according to the invention.

As noted above, the definition of related auxiliary information may include reference to, or inclusion of user-defined control option information. The flowchart of FIG. 8 describes one way in which control option information may be included in the related auxiliary information. First, a user option selection routine is executed (55). This routine may be run as a one-time procedure at a factory manufacturing the mobile unit, or at a retail establishment programming the mobile unit prior to customer acquisition. Alternatively, this routine may be run by a user at his/her discretion. For example, a mobile unit user may select from a sequence of options menus the number, type or identity of networks (WLAN, WMAN, Ad-hoc, QoS etc.), for which he/she wishes to authorize connection, or the security threshold (as between WEP and WPA for example) to which he/she wishes to adhere.

Selections made during the user option selection routine result in data being stored internal to mobile unit (56). For example, a specialty register in register block 29 (FIG. 5) might be used to stored control option information defined as a result of a user option selection routine. This stored control option information is thereafter available for inclusion within or definition of the auxiliary information portion of the search criteria applied to the KSE control block (57). In this manner, user options enable selected compatibility with one or more networks. That is, different data privacy mechanisms, as between different potentially connected networks, are enabled, disabled, or defined in relation to specific user selected options, because such the selected options may be optionally incorporated within the search criteria used by the RKSE to search for and provide related security keys.

What remains for consideration is the appropriate selection of search criteria, the derivation of index data and/or index criteria from the search criteria, the application of the index data to an associative memory to obtain an index output, the application of at least the index output to identify one or more memory locations storing one or more components of a security key.

The selection of search criteria will vary in accordance with the variety of networks potentially connected to the mobile unit. Each connecting network must provide a sufficiently able and unique set of search criteria data, such that an effective index data can be defined to appropriately select the desired security key. Yet, ideally, the search criteria and resulting index data will form a modest or minimal data set in order to minimize data computational and data storage requirements associated with the definition of the index data and its application to an associative memory. What follows hereafter are selected examples of search criteria and resulting index data appropriate for the indexing and retrieval of a security key within the operation of several wireless networks. These are merely selected examples. Many different search criteria and/or index data configurations are possible for both the illustrated network types and other networks—wireless or otherwise.

Also within the examples that follow, a hierarchal memory is generally presumed. Naturally, any competent memory architecture will suffice, so long as it is capable of storing the relevant security keys in a searchable manner. However, the memory architecture described below works particularly well for the range of security keys, including the commonly related security key components, generally implicated in the wireless systems used as teaching examples. As will be noted from what follows, a hierarchal memory architecture has considerable advantage in applications wherein a number of different type security keys are potentially involved in the data privacy mechanism(s) for one or more networks.

Figure 9:
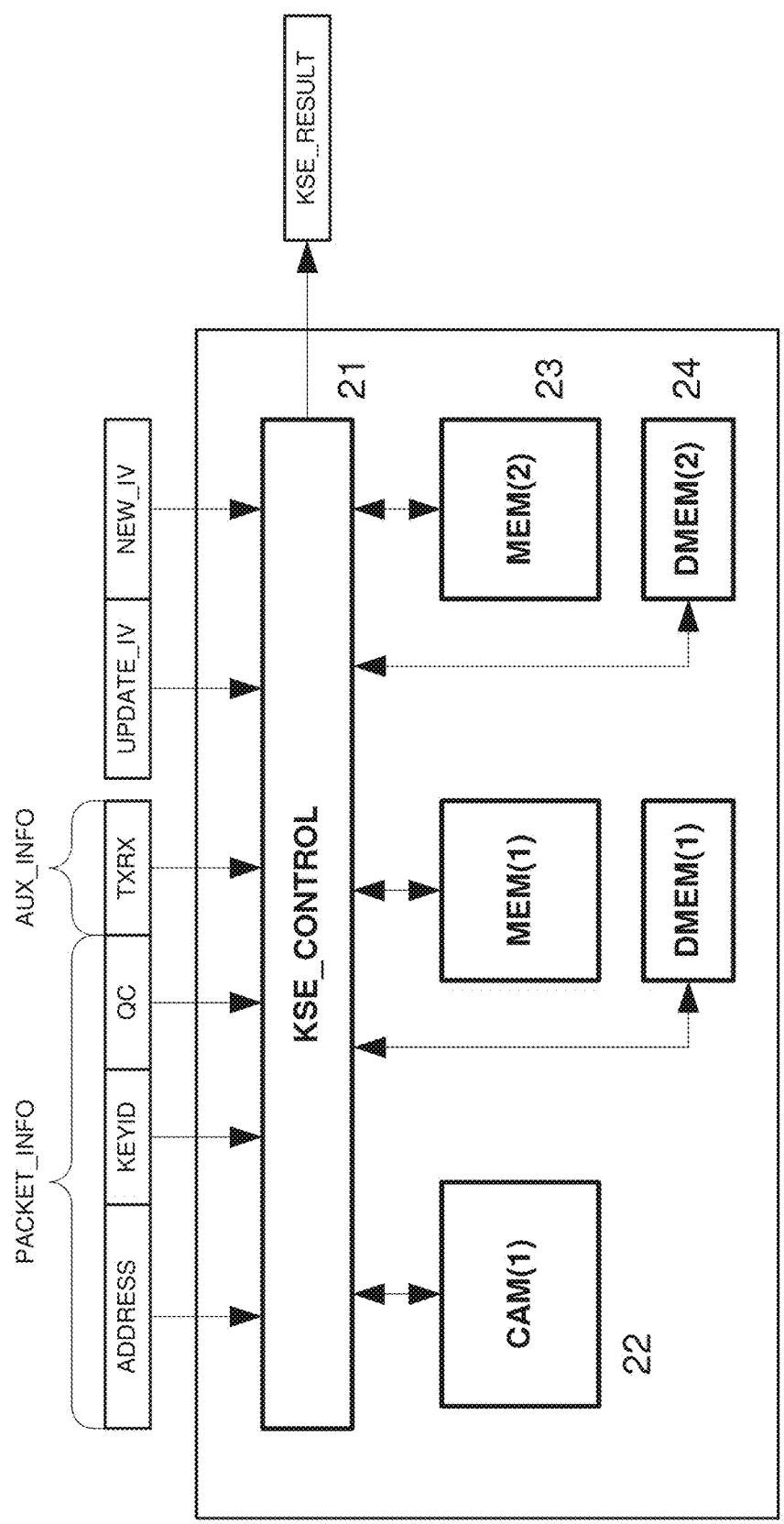
FIG. 9 is a block diagram illustrating another embodiment of a RKSE according to the invention receiving exemplary search criteria.

Consider a first example drawn to a 802.11-competent WLAN network and illustrated with respect to the block diagram shown in FIG. 9. Here, the packet information applied to KSE control block 21 comprises address data, key ID data, and QC data. The auxiliary information may include an indication of mobile unit data packet transmission (TX) or mobile unit data packet reception (RX). From this combination of search criteria, index data may be formed. Additionally, a UseGK selection may be used, for example, as index criteria. The UseGK selection has reference to full WPA2 protocol implementations and a user selection between WPA2 operation in BBS or a IBBS.

Recall that 802.11 competency generally requires compatibility with multiple protocols, including (as example) legacy WEP, WPA (a subset of 802.11i) WPA2 (full 802.11i), and QoS (802.11e). Using these different protocols as illustrative examples, the following security key implications arise.

(1) Where WEP protocol is used:
  Only a single Default Key (DK) is used as a security key, and
  No Pairwise Key (PK) or Group Key (GK) is used.
(2) Where WPA protocol is used in a BSS:
  One (1) PK is used per mobile unit, and,
  One (1) GK is used per BSS.
(3) Where WPA protocol is used in a IBBS:
  One (1) GK is used per BSS; and,
  One (1) Group Key Initialization Vector (GKIV) is used per mobile unit.
(4) Where WPA2 protocol is used in a BSS (UseGK=0):
  One (1) PK is used per mobile unit; and,
  One (1) GK is used per BSS.
(5) Where WPA2 protocol is used in an IBBS (UseGK=1);
  One (1) PK and one (1) GK are used per each mobile unit.
(6) Where 802.11e with local broadcast capability is used in conjunction with:
  (a) A legacy WEP:
    Only a single Default Key (DK) is used as a security key, and
    No Pairwise Key (PK) or Group Key (GK) is used.
  (b) WPA in a QBSS (UseGK=1):
    One (1) PK and one (1) GKIV are used per mobile unit;
    One (1) GK is used per QBSS.
  (c) WPA2 in a QBBS (UseGK=1):
    One (1) PK and one (1) GKIV are used per mobile unit;
    One (1) GK is used per QBSS.
  (d) WPA2 is a IBBS (UseGK=1):
    One (1) PK and one (1) GK are used per mobile unit.

In the foregoing, DKs and GKs are highly analogous. Both DKs and GKs are shared-keys in a BSS. That is, every AP and mobile unit in a BSS share the same DK or GK. When using the WEP protocol, the DK is set by the user. However, when using a WPA or WPA2 protocol, the GK is set automatically by the protocol.

General 802.11 competency also requires an ability to accept data packets configured according to different protocols. Several examples will be illustrated hereafter in relation to the examples showing the derivation of index data from differing bodies of search criteria related to different WLAN protocols.

Before considering these examples, however, some discussion of the two optional inputs "UPDATE_IV" and "NEW_IV" is warranted. Full 802.11 compliance requires an ability to perform all the functions necessary to implement the AES of WPA2. Data packet encryption and/or decryption may occur every frame during an exchange of data packets using the WPA2 protocol. Thus, each data frame requires a new security key typically comprising a encryption/decryption key, a corresponding cipher, and a corresponding IV. Memory addresses for each of these three security key components are known from the previous frame in the KSE. The UPDATE_IV and NEW_IV signals allow for an immediate update of an IV memory entry as provided fro by the WPA2 standard. Hence, throughout the examples that follow, these two inputs, both optionally required to fully implement WPA2, are generally included.

With all the foregoing in mind, we return to FIG. 9. In one embodiment, the auxiliary information applied to KSE control block 21 simply comprises an indication of whether the mobile unit is transmitting data (TX) or receiving data (RX). Other information related to the mobile unit, its operating mode, or another network element might also be included in the auxiliary information. For example, a register included within KSE control block 21 might store control option information indicating a user selection in relation to the UseGK variable.

The selection of index data and/or index criteria from one or more received data packets is subject to many design choices. However, several possible selections made in relation to various WLAN protocols are suggested in FIGS. 10A through 10.

Figure 10A:
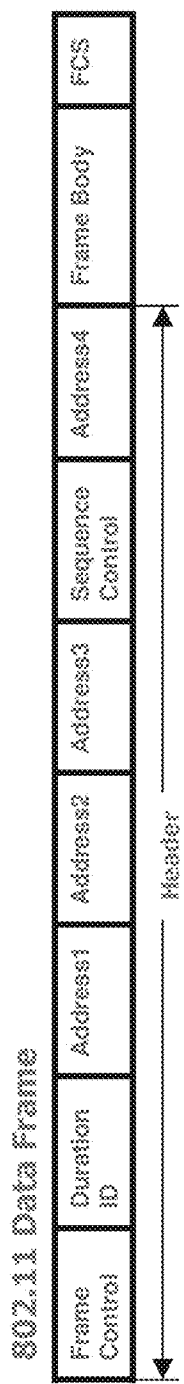
FIGS. 10A through 10E illustrate selected exemplary data packets susceptible to use in relation to a RKSE according to the invention.

FIG. 10A shows a generic data frame for a legacy 802.11 protocol without an encryption capability. Here, Address 1, the receiving (RX) network element's MAC address, and Address 2, the transmitting (TX) network element's MAC address may be used as index data to identify a DK stored in the KSE memory.

Figure 10B:
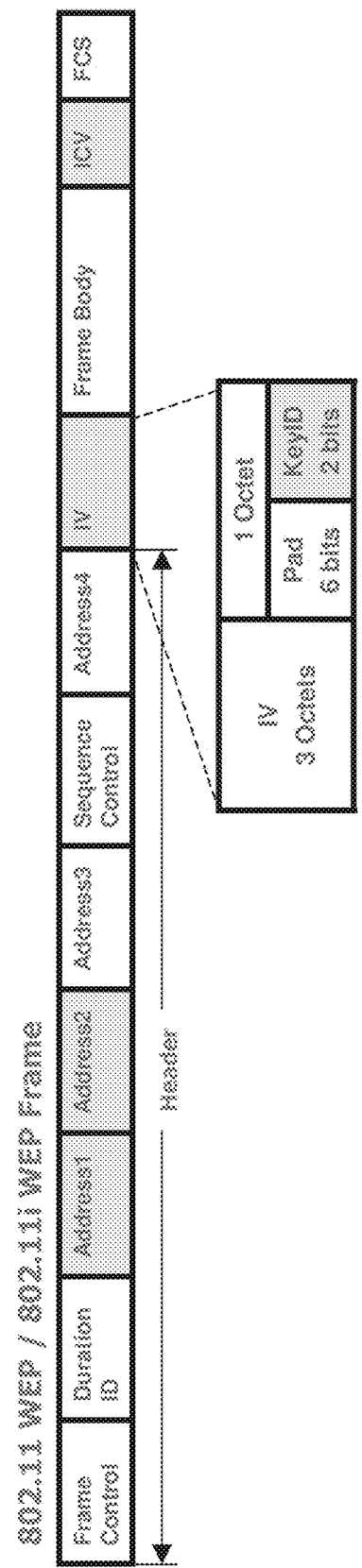

FIG. 10B shows a 802.11 WEP or 802.11i WEP data frame. The TX and RX MAC addresses may be supplemented with selected data bits from the IV data field and associated cyclical redundancy code (CRC) bit(s) or parity bit(s) (ICV).

Figure 10C:
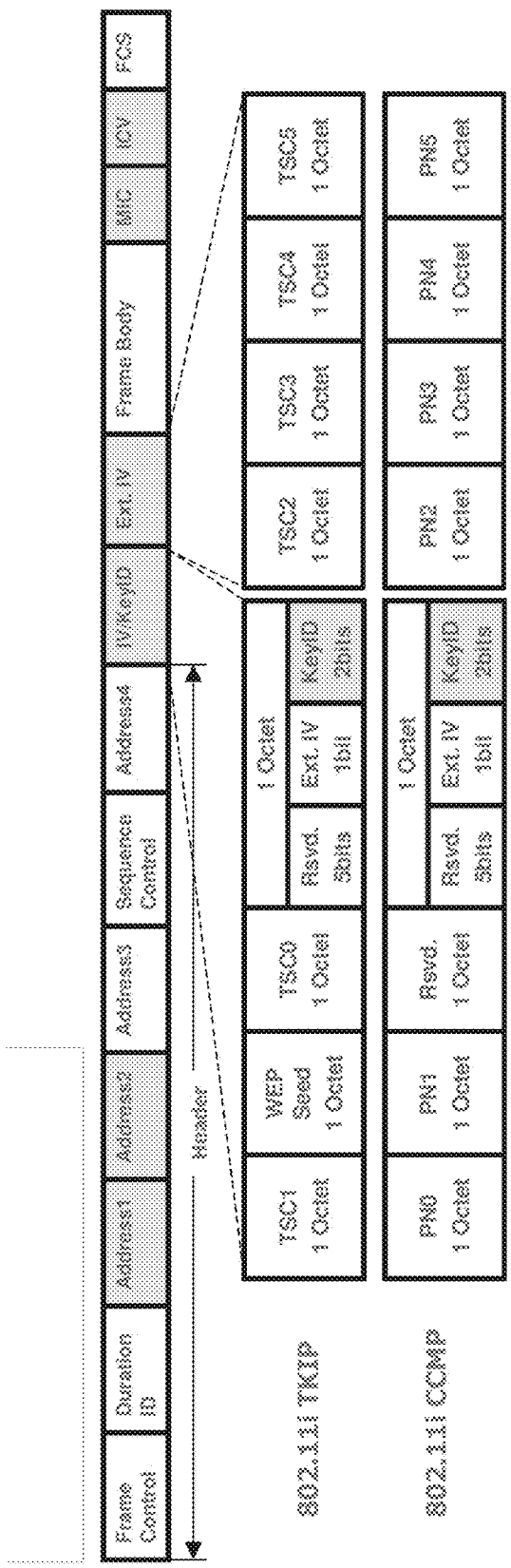

FIG. 10C shows a 802.11i data frames corresponding to a WPA and WPA2 protocols. The WPA protocol implements TKIP and WPA2 implements CCMP. Here, the TX and RX MAC addresses may be supplemented with selected bits from the extended IV data field and corresponding message integrity check (MIC) bit(s) and ICV bit(s). It should be noted that the entire data frame in generally required to be stored with the KSE for selected 802.11i functions such as "Replay," but only intelligently selected data words or bits need be extracted for use within the definition of the index data and/or index criteria.

Figure 10D:
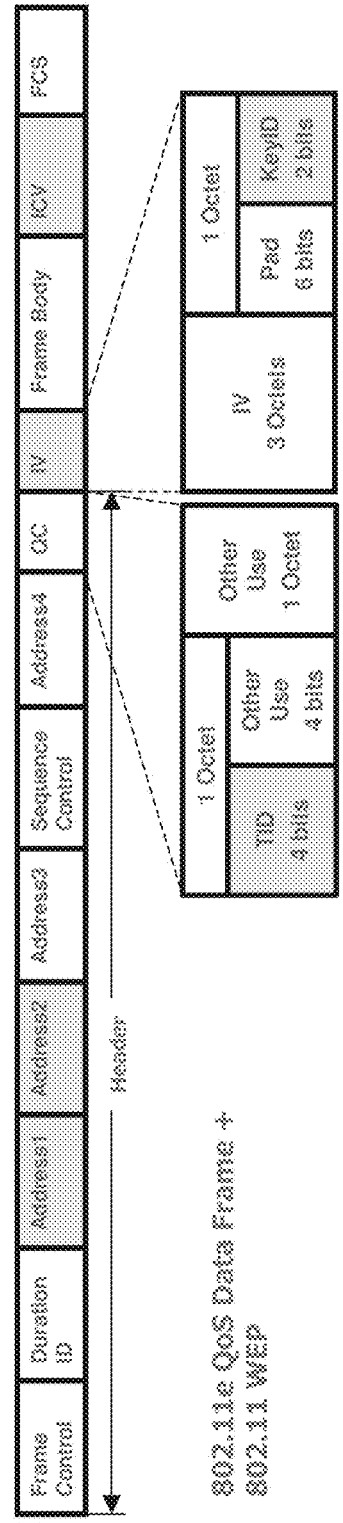

FIG. 10D shows a legacy WEP data frame adapted to implement QoS using the 802.11e protocol. Here, the MAC addresses, the ICV bit(s), and IV bit(s) may be supplemented by selected quality class (QC) bit(s) providing a data traffic identity or priority used to determine class of service.

Figure 10E:
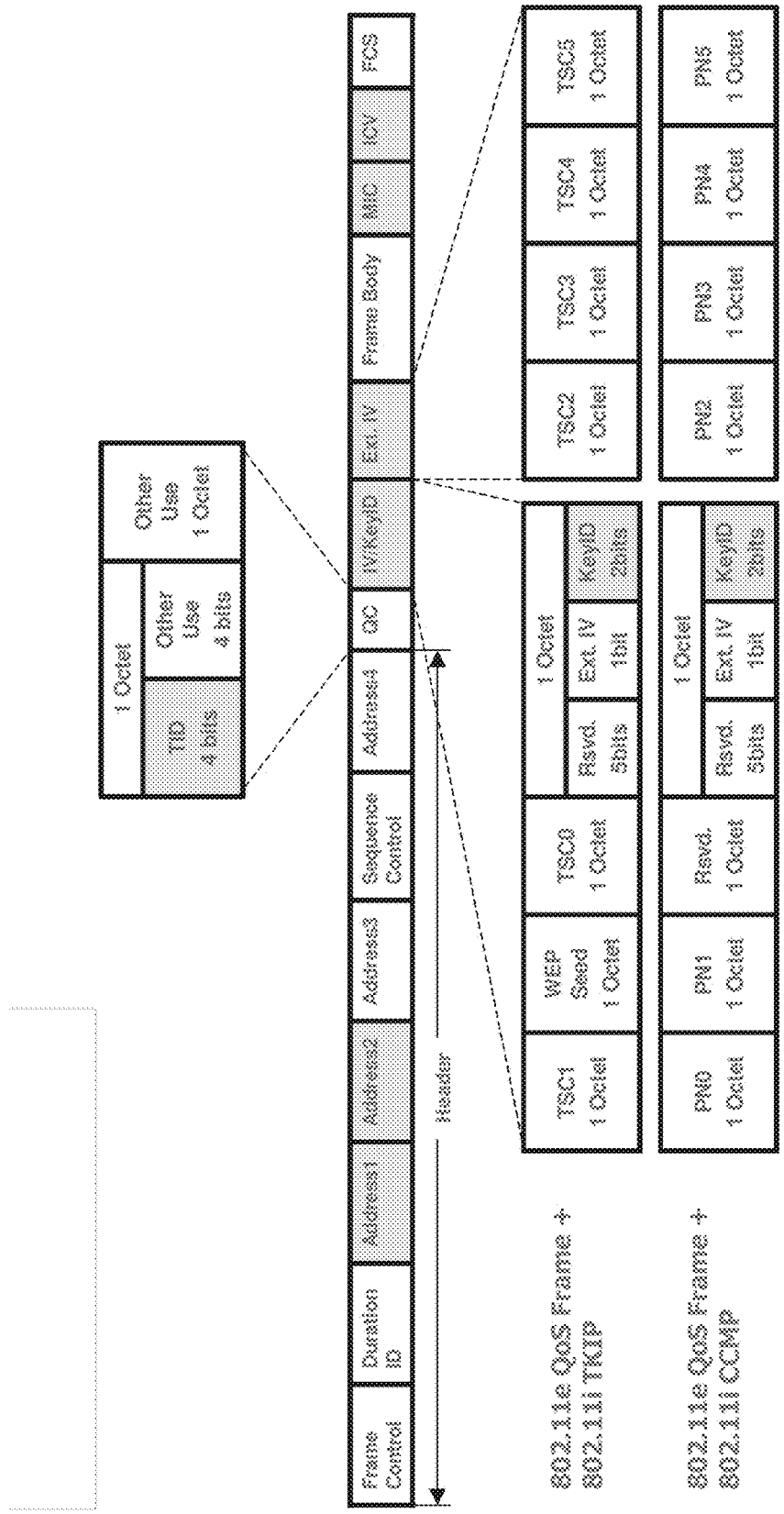

One may readily derived from the data frame example shown in FIG. 10D how the respective data frame examples shown in FIG. 10C might be similar modified—with the resulting changes being made to the selection index data. These modifications are shown in FIG. 10E.

With these specific examples of data packet information, taken together with the previously discussed examples of auxiliary information and control option information, one may understand how search criteria—generically available for a plurality of protocols arising from multiple networks—may be used to define index data and/or index criteria.

In addition to the foregoing, a mobile unit setting that indicates a broadcast/multicast mode of operation verses a unicast mode operation may be used as part of the search criteria. Further, the type of security key cipher being used (e.g., a usegroup cipher or a normal cipher (WEP, TKIP, or CCMP) may included in the search criteria. Such additional search criteria may be used, for example, as index criteria.

Figure 11:
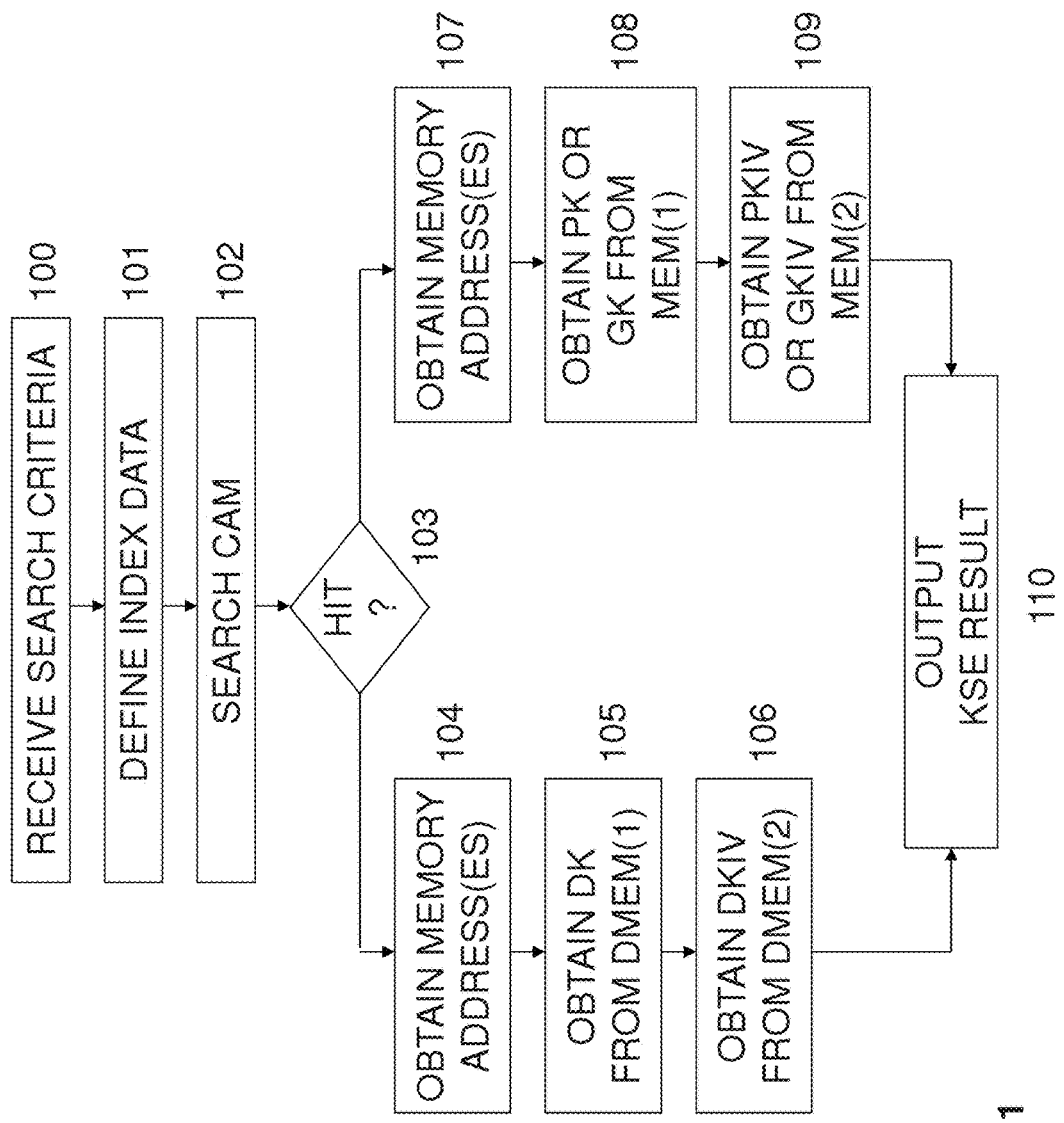
FIG. 11 is a flowchart illustrating one exemplary search method related to a RKSE according to the invention.

The results of associative memory search in accordance with index data need not be used in a strictly linear manner. Consider for example the flowchart shown in FIG. 11. Here, search criteria is received (100), index data (and/or index criteria) is defined (101), and an associative memory is searched (102). The result of the associative memory search may result in a "HIT" (a CAM memory entry corresponding to the applied index data is found) or a "MISS" (a CAM memory entry is not found) (103). An index output corresponding to the MISS condition is used, potentially in conjunction with selected search criteria, to obtain one or more default memory (DMEM) address(es) (104). With one or more default memory addresses in hand, a DK is located in DMEM(1) (105) and a corresponding DKIV is located in DMEM(2) (106). In this manner, a related or hierarchal memory is used to good advantage to locate both components of a security key.

In contrast, where an index output corresponding to the HIT condition is used, again potentially in conjunction with selected search criteria, one or more memory (MEM) address(es) are obtained (107). Thereafter, a PK or a GK is located in MEM(1) (108) and a corresponding PKIV or GKIV is located in MEM(2) (109). Once a security key comprising a DK+DKIV, a PK+PKIV, or a GK+GKIV is obtained, it is output as a KSE result (110).

Figure 12:
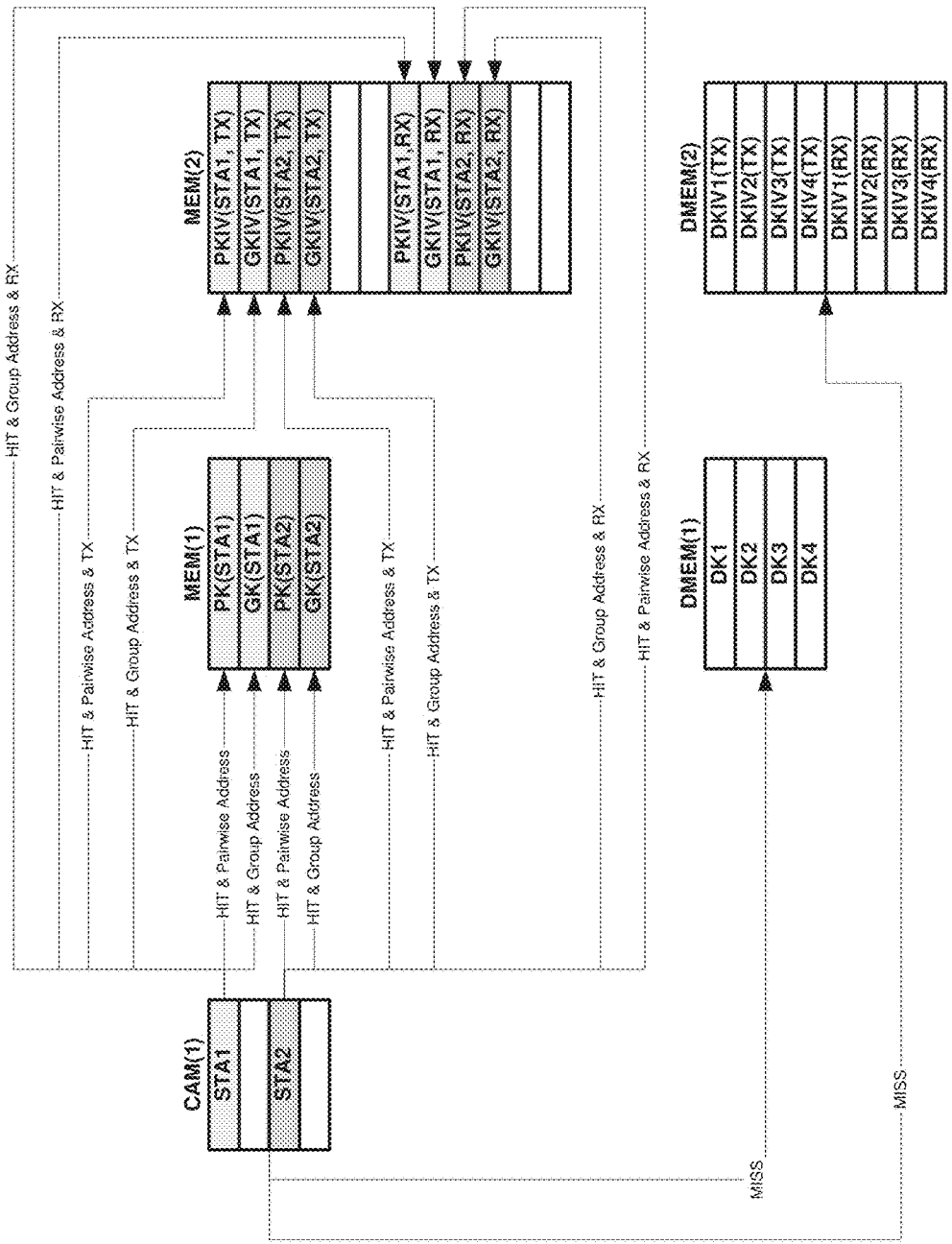
FIG. 12 illustrates another exemplary search method related to a RKSE according to the invention.
Figure 13:
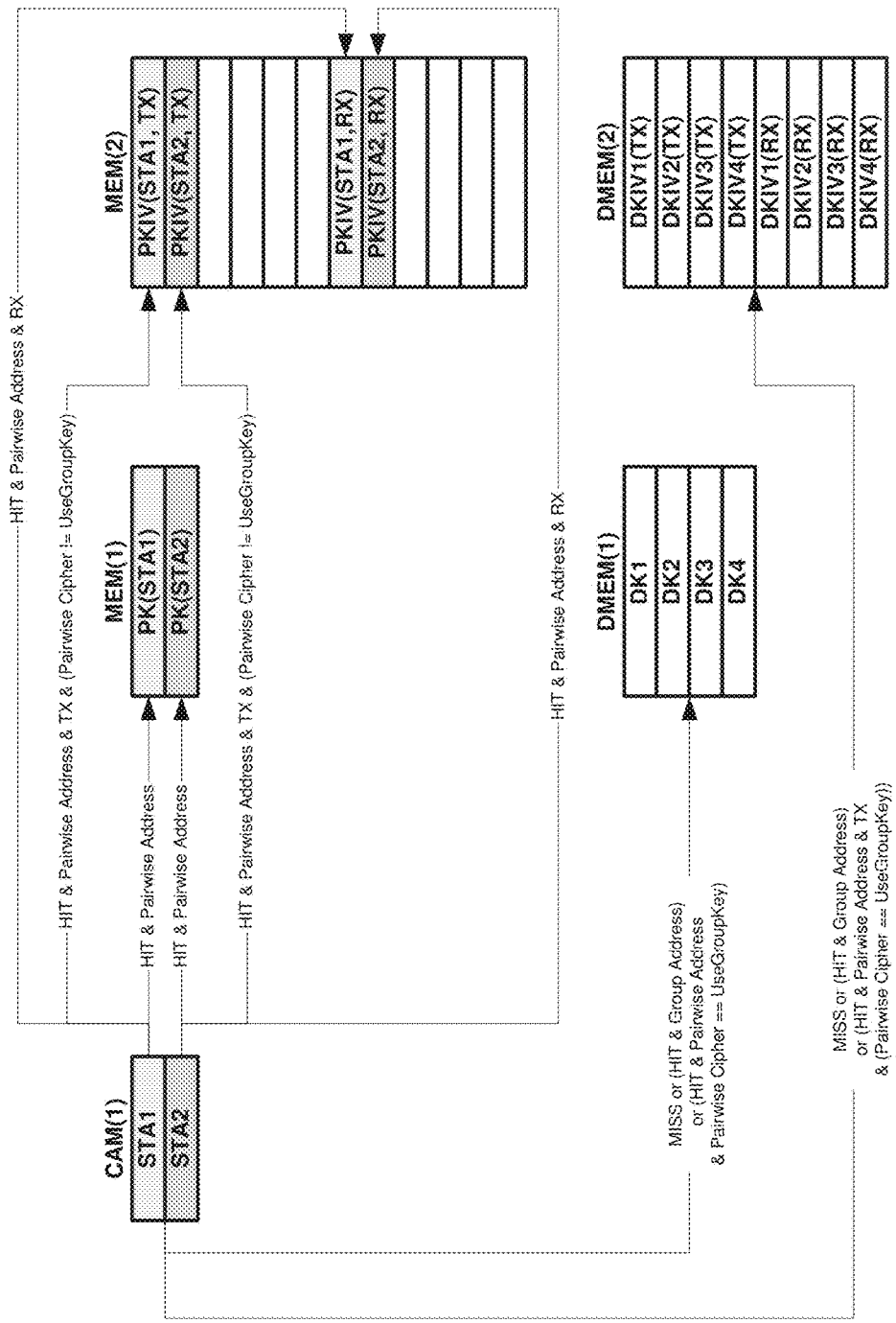
FIG. 13 illustrates yet another exemplary search method related to a RKSE according to the invention.

The flowcharts shown in FIGS. 12 and 13 summarize much of the foregoing discussion made in relation to WLAN protocols and the methods adapted to the dictates of invention by which a security key may be identified. FIG. 12 relates to a WLAN protocol wherein a user has selected UseGK=1. Packet information (e.g., respective MAC addresses) related to one of two mobile units (or stations STA) is used as index data to search CAM(1). A MISS condition will result in DK selected from DMEM(1) and a corresponding DKIV selected from DMEM2. Note that DKIVs are selected in part on the basis of whether the mobile unit is in TX mode or RX mode as indicated by the auxiliary information.

A HIT condition resulting from the search of CAM(1) taken together with a PK Address and a GK Address obtained from CAM(1) select a corresponding PK and GK stored in MEM(1). The HIT condition and PK Address and GK Address taken together with an RX or TX indication are used to select a corresponding PKIV and GKIV.

FIG. 13 relates to a WLAN protocol wherein a selection of UseGK=0 is made by a user. As a GK output is no longer indicated on the basis of the UseGK selection, only PKs and DKs with their corresponding IV are implicated in the search. Here, a MISS condition or other condition generally indicating use of a GK will result in the selection of a DK and DKIV as above from DMEM(1) and DMEM(2) respectively. A PK and PKIV are also similarly selected as above from MEM(1) and MEM(2).

All of the foregoing clearly illustrates how search criteria received in relation to one of a number of different WLAN protocols can be used to form competent index data adapted to efficiently search an associative memory for a desired security key address, comprising for example either a memory address and a default memory address. This security key address may thereafter be applied as an index output together with selected index criteria to locate various components of the security key from a defined hierarchy of memories. In the illustrated examples shown in FIGS. 12 1 and 13, keys and corresponding IVs were located. Other components in any reasonable number might similarly be found in a corresponding hierarchy of memories.

Hence, one can now envision how a mobile unit might successfully migrate through a number of different WLANs or simultaneously connect to multiple WLANs using a RKSE capable of identifying a desired security key from a plurality of stored security keys—regardless of the different protocols and data privacy mechanisms used by the respective WLANs.

A similar capability will now be described in relation to WMANs. As noted above, WMANs use different entirely different protocols as compared with WLANs. In fact, there are currently competing, proposed WMAN standards. Yet, the invention is as readily applicable to WMANs as it is to WLANs.

In general, the 802.16 standard provides for medium access control (MAC) which is connection oriented and designed to support a point-to-multipoint architecture between a central base station (BS) and multiple independent mobile units. Mobile units within a WMAN generally have corresponding MAC addresses, but the MAC address is not used during each data packet communication frame. Rather, BS to mobile unit connections are assigned a respective Connection Identifier (CID).

In most WMAN protocols, a mobile unit "associates" with a BS by first requesting an allocation of bandwidth. Thereafter, the BS assigns bandwidth and one or more corresponding CIDs. The BS also provides a list of corresponding Security Association Identifiers (SAIDs). Hence, when a mobile unit sends a data packet to the BS, for example, an appropriate SAID must be provided in order to enable data privacy. Accordingly, the mobile unit must be able to identify a desired SAID from a plurality of stored SAIDs on the basis of a corresponding CID. Stated in other terms, the CID becomes, at least in one embodiment, a portion of the search criteria applied to a RKSE finding application in a mobile unit adapted to connect with one or more WMANs. In a related embodiment, the so-called Encryption Key Sequence (EKS) routinely provided in relation to a WMAN CID may also be used as search criteria.

Like the WLAN security keys, WMAN security keys generally comprise multiple components. Looking at the 802.16 protocol for example, the corresponding security key comprises multiple components, including at least a Traffic Encryption Key (TEK) and a corresponding IV. A related Security Association (SA) value is also generally associated with a security key as part of a complex cipher.

Figure 14:
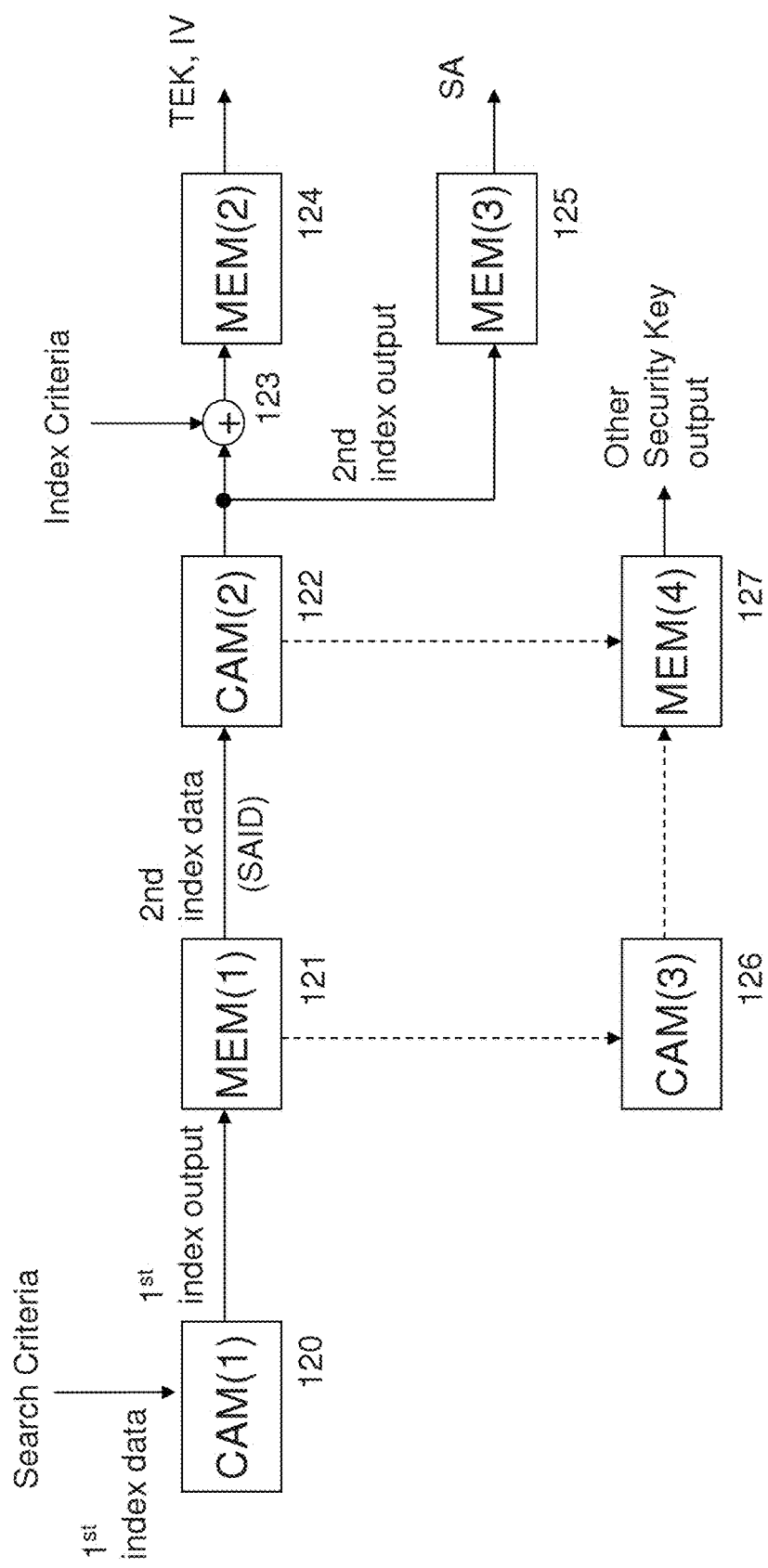
FIG. 14 is a diagram illustrating a logic flow for another exemplary search method related to a RKSE according to the invention.

The block diagram shown in FIG. 14 broadly describes one embodiment of the invention drawn to a mechanism and related method of searching for and identifying a desired security key having multiple components in the context of an exemplary WMAN implementing the 802.16 protocol. Search criteria, including for example, data bits selected from a CID in a received data packet is used to form first index data applied to a first associative memory 120 (CAM1). First associative memory 120 (CAM1) outputs a first index output (e.g., an memory address for a corresponding SAID) in response to the first index data. The first index output is subsequently applied to a first memory 121 (MEM1) to obtain security key data which may subsequently be used, in whole or in part, as second index data. In the illustrated example a SAID corresponding to the first index output is identified in first memory 121.

Should the search of the first associative memory 120 and/or the subsequent reference to first memory 121 result in a MISS condition, an error message is returned, or alternatively some embodiments may define a default key stored in a default memory (not shown in FIG. 14). As above, the default memory may be a hierarchical memory arranged to return multiple components of a security key.

Returning FIG. 14, however, the output of first memory 121 might optionally be used in a related hierarchical memory to identify other information related to the desired security key. For example, the second index data output from first memory 121 might be used to search a third associative memory 126 (CAM3). This search may be performed following application of index criteria to the second index data in a logical index operation block (not shown). The index output from third associative memory 126 may thereafter be used to reference a fourth memory 127 (MEM4) to obtain the desired security key information. Indeed, any reasonable number of cascaded associative memory searches and subsequent memory references may be used to rapidly locate components of the desired WMAN security key.

In FIG. 14, the second index data output from first memory 121 is applied to a second associative memory 122 (CAM2) to obtain a second index output (e.g., a memory address to be applied to a third memory 125 (MEM3). In response to the second index output, the third memory 125 (MEM3) outputs a SA corresponding to the desired security key. In the illustrated example of FIG. 14, the second index output in also applied to a logical index operation block 123 (e.g., a adder or a concatenation circuit) along with index criteria. The output of logical index operation block 123 is thereafter applied to a second memory 124 (MEM2) to select a TEK and IV corresponding to the desired security key.

In one embodiment of the invention, the index criteria applied to logical index operation block 123 comprises one or more bits selected from the EKS. For example, the most significant bit (MBS) and least significant bit (LSB) of the EKS might be used to select between TEK and IV combinations stored in second memory 124.

From the foregoing, one can understand how a mobile unit having a RKSE implemented in accordance with the invention is capable of moving between multiple WLAN and WMAN systems or simultaneously connecting to multiple WLAN or WMAN systems. That is, the possibility of different data communication protocols and different data privacy mechanisms, as between different WLANs and WMANs, will not prevent the RKSE from efficiently locating a desired security key corresponding to a data packet received from (or to be transmitted to) any one of the WLANs or WMANs.

Figure 15:
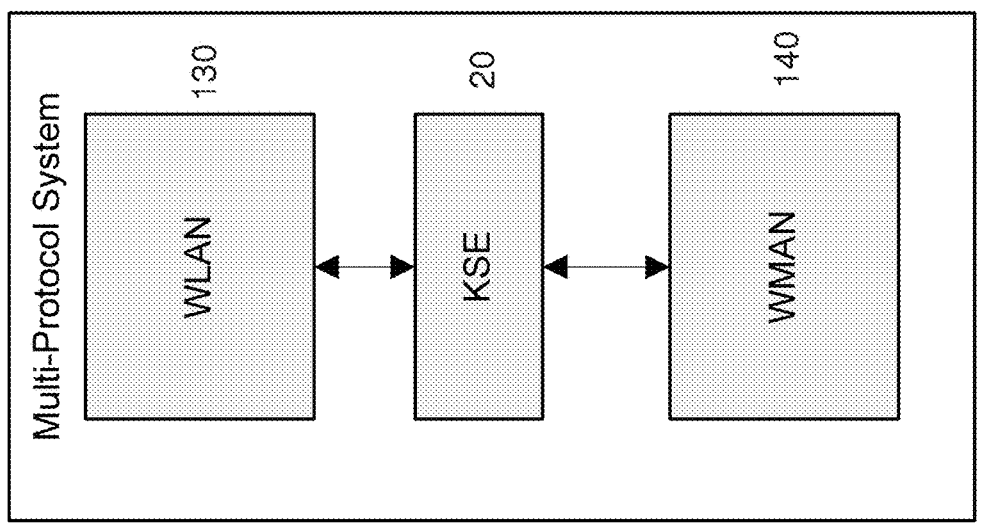
FIG. 15 is a block level diagram of another mobile unit adapted to incorporate a one embodiment of a RKSE according the invention.
Figure 16:
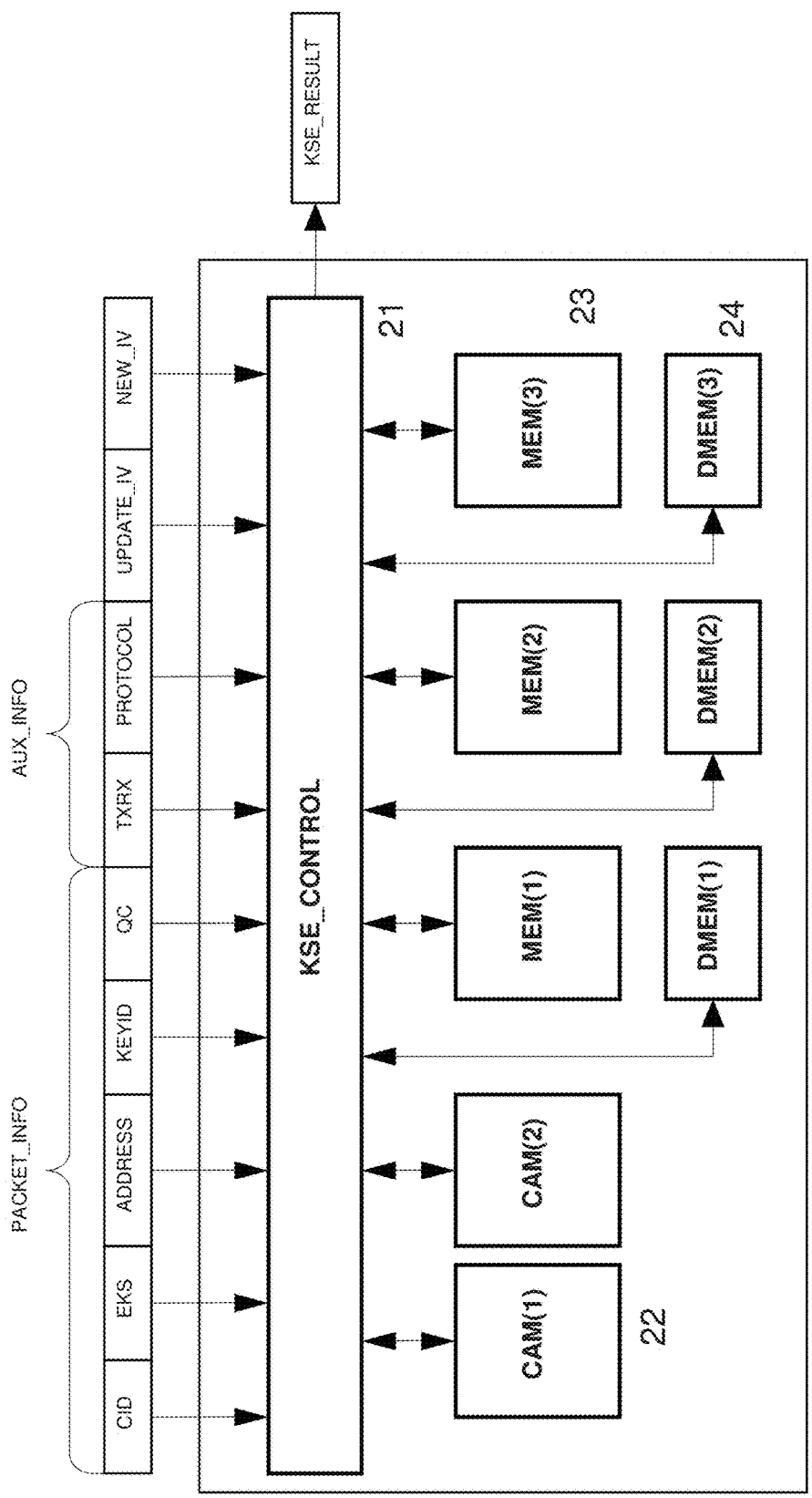
FIG. 16 is a block diagram illustrating still another embodiment of a RKSE according to the invention receiving exemplary search criteria.

This concept is further extended in the example illustrated in FIGS. 15 and 16. FIG. 15 conceptually illustrates the use of single RKSE 20 in a mobile unit 10 adapted to interface with one or more WLANs and one or more WMANs. Despite the different protocols implicated in this capability, only a single RKSE 20 need be included in mobile unit 10. That is, circuitry and functionality associated with the one or more WLANs 130 and circuitry and functionality associated with the one or more WMANs 140 in mobile unit 10 both utilize the common resource created by RKSE 20.

FIG. 16 illustrates this aspect of the invention in some additional detail. Here, packet information may include, as examples, MAC addresses and CIDs, as well as selected bits from the EKS, KeyID, and QC. The auxiliary information includes, as example, a RX/TX indication and a protocol indication. From this fairly limited set of search criteria, together with optionally provided control option information, the RKSE is able to locate and output a desired security key (KSE_RESULT) within a plurality of stored security keys.

A hierarchical memory comprising, for example, associative memory 22, memory 23 and default memory 24 may be used in a manner similar to that described above to efficiently provide the desired security key, particularly where the security key comprises multiple components.

Numerous user-defined control options exists within the context of the example illustrated in FIGS. 15 and 16. (The "user" within this discussion may be an end user, a retailer, or a factory programmer relative to the mobile unit). For example, a user may select between; (1) a single mode of operation enabling either WMAN or WLAN connectivity, but not both, or (2) a dual mode of operation enabling both WMAN and WLAN connectivity. Where a single mode of operation is selected, the user may thereafter select a UseGK mode, wherein UseGK=1 enables certain types of mobile unit connectivity within ad-hoc networks.

Figure 17:
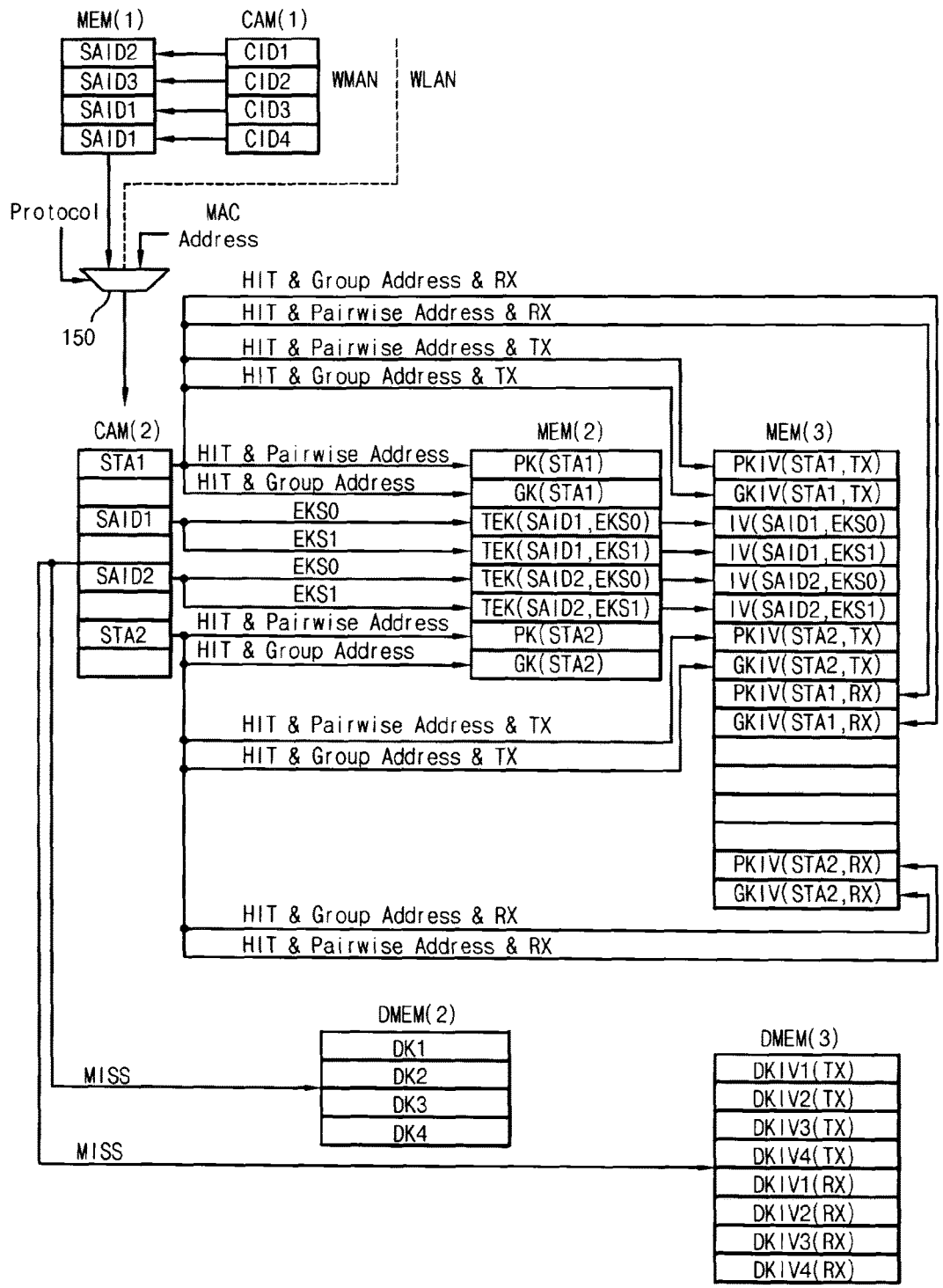
FIG. 17 illustrates still exemplary search method related to a RKSE according to the invention; and, FIG. 18 illustrates yet another exemplary search method related to a RKSE according to the invention.
Figure 18:
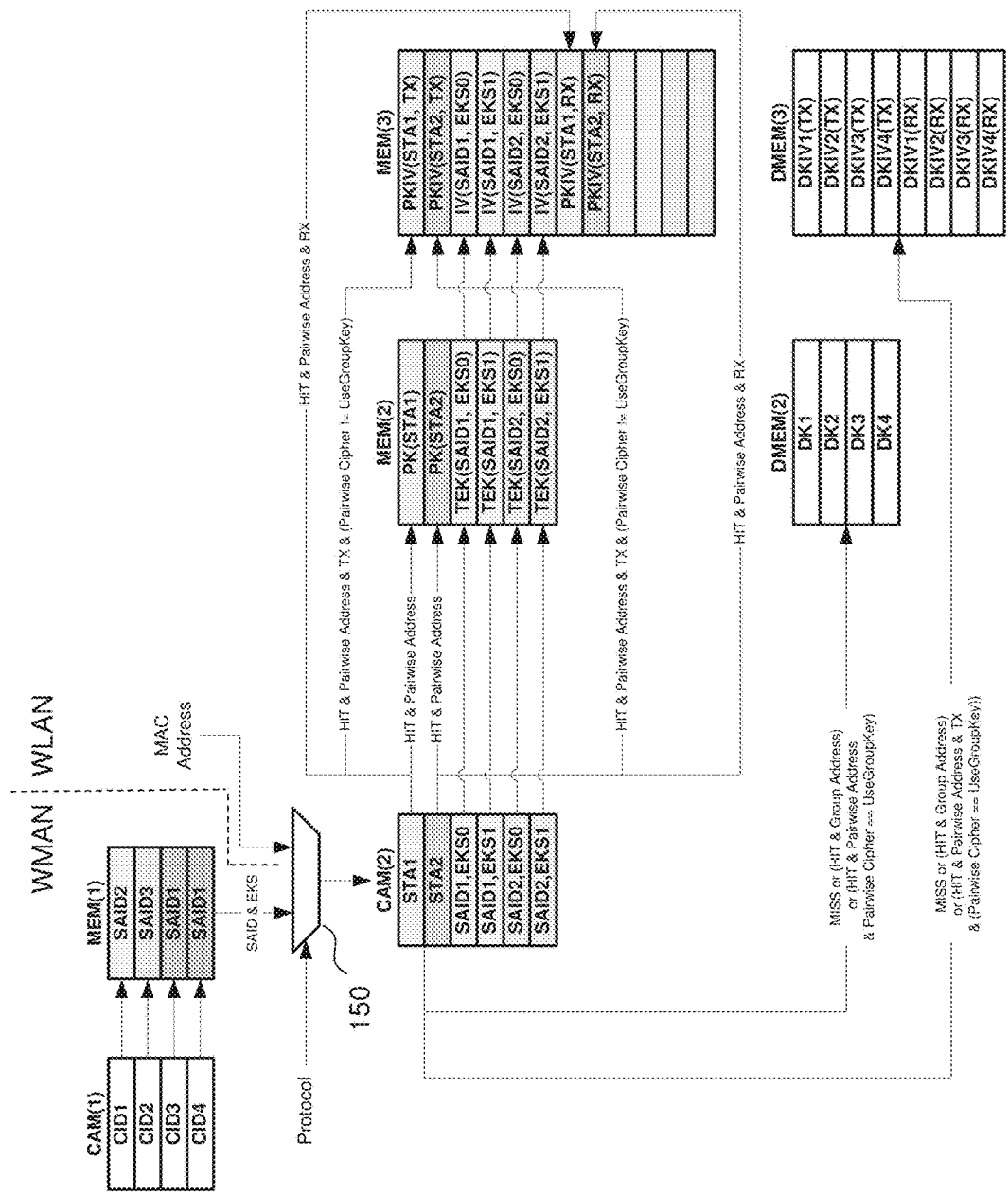

The foregoing concepts are further illustrated in the diagrams of FIGS. 17 and 18. FIG. 17 illustrates an exemplary RKSE searching method according to one embodiment of the invention in which a user has selected dual mode operation (i.e., WLAN and WMAN operation) and UseGK=1. FIG. 18 illustrates a related exemplary RKSE searching method according to another embodiment of the invention in which the user has selected dual mode operation (i.e., WLAN and WMAN operation) and UseGK=0. Both illustrated methods might be implemented, for example, in the RKSE shown in FIG. 16.

In both diagrams, a multiplexer 150 is used, for example, to receive a competent block of search criteria (e.g., including MAC addresses) from a WLAN and/or at least a SAID corresponding to a prior conducted search from a WMAN.

Because of the added complexity of WMAN security keys, CAM(1) in FIG. 16 is used to store at least SAID addresses and is searched in relation to index data derived from WMAN related search criteria, including for example a CID and EKS. The resulting index output from CAM(1) is used to reference MEM(1) and find at least a corresponding SAID. This SAID, together with other information, possibly provided in the form of index criteria combined with the SAID, are applied through multiplexer 150 as index data to CAM(2).

Continuing with the WMAN search routine, a SAID entries located in CAM(2) is used to locate corresponding security key components in MEM(2) and MEM(3). In the illustrated example shown in FIG. 17, a logical combination of the SAID entry and selected bits from the EKS are used to reference MEM(2), and the entry in MEM(2) (e.g., a TEK and/or related data) is thereafter used to reference MEM(3) (storing a corresponding IV).

By way of comparison, a WLAN applies index data derived from WLAN search criteria directly through multiplexer 150 to CAM(2). The search flow from CAM(2) through MEM(2) and MEM(3) for a HIT condition, as well as through DMEM(2) and DMEM(3) for a MISS condition proceeds as previously described with reference to FIG. 12.

The exemplary search flow shown in FIG. 18 differs from that of FIG. 17 in relation to the UseGK selection and hence the possible search for GKs. As shown in FIG. 18, CAM(2) is differently utilized in that the SAID and EKS data from a WMAN are combined in the index data used to search CAM(2). In contrast, the EKS data is applied as index criteria to the index output of CAM(2) in the method shown in FIG. 17. Thus, the use of CAM(2) in the embodiment shown in FIG. 18 is clearly more efficient.

This is just one of many specific examples showing how a hierarchical memory associated with a RKSE according to embodiments of the invention may be modified in accordance with numerous design parameters and objectives. Different algorithms may be constructed to search the RKSE memory in relation to different data protocols and unique multi-component security keys. In the case of multi-component security keys, cascading searches through a hierarchy of related memories might be particularly advantageous. Hence, numerous memory architectures are possible, including architectures comprising one or more memories and/or associative memories. As has been seen in some of the foregoing examples, default memories may also be used to good advantage, particularly in relation to legacy protocols or search misses.

As has been readily demonstrated any reasonable number of data sources (both data packet related and otherwise) may be drawn upon to form search criteria useable by the RKSE. From this search criteria, index data and index criteria may be defined and applied to construct efficient search algorithms through the data stored in the RKSE memory.

Within embodiments of the invention, user-defined control options may also be readily applied to problem of searching for a security key. Consider the example of UseGK selection previously noted. Where UseGK=1, one GK is used per mobile unit for protocols such as WPA2 and 802.11e. And, one memory entry {e.g., MEM(1)[INDEX (1)+1]} is located where an indexing CAM address is a group address, and another memory entry {e.g., MEM(1) [INDEX(1)]} is located where the indexing CAM address is not a group address. Where, however, UseGK=0, one GK is used per BSS for protocols such as WEP and WPA. And, one default memory entry {e.g., DMEM(1)[KEYID]} is located where an indexing CAM address is a group address, and a memory entry {e.g., MEM(1)[INDEX(1)]} is located where the indexing CAM address is not a group address.

Consider similarly the influence of a UseGK selection on the search for a security key having a particular type of cipher component—e.g., the UseGroupCipher. Relative to one embodiment of the invention, where a selected cipher is a UseGroupCipher, and UseGK=0 during a TX operation, the key, cipher, and IV are located in default memory. For a RX operation, however, the IV is located in memory, while the key and cipher are located in default memory.

Where a selected cipher is a UseGroupCipher, and UseGK=1 during a TX operation, again the key, cipher, and IV are located in default memory. For a RX operation, however, the key, cipher and IV are located in memory.

These selected examples illustrate the power and flexibility of the invention to accommodate different types of mobile units having different modes of operation, different user control options.

In relation to the invention, hardwire connected networks differ only in the manner of their connection. The security key considerations resulting from the unique protocols and data privacy mechanisms used by hardwire connected networks are readily addressed by the invention. This is important given the number of legacy wired networks. Thus, the principles and concepts arising from teaching examples presented above and drawn to wireless networks are applicable to wired networks as well.

What is claimed:

1. A method of operating a mobile unit adaptable to connect to multiple networks having respective different data privacy mechanisms, the mobile unit including a Reconfigurable Key Search Engine (RKSE) and a memory system storing a plurality of security keys, the method comprising:

receiving a first data packet at the mobile unit from a first network among the multiple networks connected to the mobile unit, and thereafter reconfiguring the RKSE of the mobile unit into a first data privacy configuration enabling a first searching algorithm and obtaining from the memory system of the mobile unit a first security key from among the plurality of security keys using the first data privacy configuration of the RSKE; and receiving a second data packet at the mobile unit from a second network among the multiple networks connected to the mobile unit, and thereafter reconfiguring the RKSE of the mobile unit into a second data privacy configuration enabling a second searching algorithm and obtaining from the memory system of the mobile unit a second security key from among the plurality of security keys using the second data privacy configuration of the RSKE, wherein the second data privacy configuration is different than the first data privacy configuration.

2. The method of claim 1, wherein the first and second data privacy configurations are respectively defined in relation to auxiliary information related to the mobile unit or an element in one of the multiple networks.

3. The method of claim 2, wherein the auxiliary information comprises control option information defined in accordance with selections of user-defined control options.

4. The method of claim 3, wherein the memory system is a hierarchical system comprising an associative memory and a memory respectively searched by the first and second searching algorithms.

5. The method of claim 4, wherein the memory system further comprises a default memory searched by at least the first searching algorithm.

6. The method of claim 1, further comprising:

outputting the first security key in response to the first searching algorithm and processing the first data packet in relation to the first security key; and outputting the second security key in response to the second searching algorithm and processing the second data packet in relation to the second security key.

7. The method of claim 6, wherein the first network comprises a Wireless Local Area Network (WLAN) and the first security key comprises at least one of an encryption/decryption key, a cipher, and an Initialization Vector (IV).

8. The method of claim 6, wherein the first network comprises a Wireless Local Area Network (WLAN) and the first security key comprises a default key.

9. The method of claim 6, wherein the second network comprises a Wireless Metropolitan Area Network (WMAN) and the second security key comprises at least one of a Security Association Identifier (SAID), a Traffic Encryption Key (TEK), a Security Association (SA) and an Initialization Vector (IV).

* * * * *